United States Patent
Rudolph et al.

(10) Patent No.: US 12,511,533 B2
(45) Date of Patent: Dec. 30, 2025

(54) ANOMALOUS REGION DETECTION WITH LOCAL NEURAL TRANSFORMATIONS

(71) Applicant: Robert Bosch GmbH, Stuttgart (DE)

(72) Inventors: Maja Rudolph, Madison, WI (US); Chen Qiu, Sindelfingen (DE); Tim Schneider, Nufringen (DE)

(73) Assignee: Robert Bosch GmbH (DE)

( * ) Notice: Subject to any disclaimer, the term of this patent is extended or adjusted under 35 U.S.C. 154(b) by 1209 days.

(21) Appl. No.: 17/372,204

(22) Filed: Jul. 9, 2021

(65) Prior Publication Data
US 2023/0025238 A1 Jan. 26, 2023

(51) Int. Cl.
*G06N 3/08* (2023.01)
(52) U.S. Cl.
CPC ..................... *G06N 3/08* (2013.01)
(58) Field of Classification Search
None
See application file for complete search history.

(56) References Cited

U.S. PATENT DOCUMENTS 11,225,259 B1 * 1/2022 Katsuki ............... G08G 1/166

FOREIGN PATENT DOCUMENTS

WO WO-2021191908 A1 * 9/2021 ....... G06F 18/24147

OTHER PUBLICATIONS

Qiu et al., Neural Transformation Learning for Deep Anomaly Detection Beyond Images, arXiv:2103.16440v1 [cs.LG] Mar. 30, 2021; Total pp. 20 (Year: 2021).*
Deldari et al., "Time-series Change Point Detection with Self-Supervised Contrastive Predictive Coding", Dec. 2020, Cornell University Library, pp. 1-12.
Oord et al., "Representation learning with contrastive predictive coding", arXiv preprint arXiv:1807.03748 (2018), 13 Pages.
Löwe et al., "Putting an end to end-to-end: Gradient-isolated learning of representations", arXiv:1905.11786v2 [cs.LG] Nov. 7, 2019, 15 Pages.

(Continued)

*Primary Examiner* — Alan Chen
(74) *Attorney, Agent, or Firm* — Dickinson Wright PLLC

(57) ABSTRACT

A anomalous region detection method includes receiving time series data being grouped in patches, encoding, via parameters of an encoder, the data to obtain local latent representations, determining a representation loss from the local latent representations, transforming the local latent representations associated with each patch, via at least two local neural transformations, to a series of diverse transformed vector representations, determining a dynamic deterministic contrastive loss (DDCL) from the series of diverse transformed vector representations, combining the representation loss and the DDCL to obtain updated parameters, updating the parameters of the encoder with the updated parameters, scoring each of the series of the diverse transformed vector representations, via the DDCL, to obtain a diverse semantic requirement score associated with each patch, smoothing the diverse semantic requirement score to obtain a loss region, masking data associated with the loss region to obtain verified data, and outputting the verified data.

20 Claims, 13 Drawing Sheets

(56) References Cited

OTHER PUBLICATIONS

Winkens et al., "Contrastive training for improved out-of-distribution detection", arXiv:2007.05566v1 [cs.LG] Jul. 10, 2020, 18 Pages.
Tack et al., "CSI: Novelty Detection via Contrastive Learning on Distributionally Shifted Instances", arXiv:2007.08176v2 [cs.LG] Oct. 21, 2020, 25 Pages.
Köpuklu et al., "Driver Anomaly Detection: A Dataset and Contrastive Learning Approach",2021 IEEE Winter Conference on Applications of Computer Vision (WACV) 2021, 10 Pages.
Qiu et al., "Neural Transformation Learning for Deep Anomaly Detection Beyond Images." arXiv:2103.16440v3 [cs.LG] Jul. 13, 2021, 20 Pages.
Chen et al., "A Simple Framework for Contrastive Learning of Visual Representations". Proceedings of the 37th International Conference on Machine Learning 2020, 11 Pages.
Zhao et al., "On Using Classification Datasets to Evaluate Graph Outlier Detection: Peculiar Observations and New Insights", arXiv:2012.12931v3 [cs.LG] May 18, 2021, 30 Pages.
Xu et al., "How Powerful Are Graph Neural Networks?", arXiv:1810.00826v3 [cs.LG] Feb. 22, 2019, 17 Pages.
Ruff et al. "Deep One-Class Classification", Proceedings of the 35th International Conference on Machine Learning, PMLR 80:4393-4402, 2018, 10 Pages.

* cited by examiner

US 12,511,533 B2

ANOMALOUS REGION DETECTION WITH LOCAL NEURAL TRANSFORMATIONS

TECHNICAL FIELD

This disclosure relates generally to anomaly region detection in a machine learning system. More specifically, this application relates to improvements in anomaly region detection of a time series in a machine learning system via local neural transformation.

BACKGROUND

In data analysis, anomaly detection (also referred to outlier detection) is the identification of specific data, events, or observations which raise suspicions by differing significantly from the majority of the data. Typically the anomalous items will translate to some kind of problem such as a structural defect, faulty operation, malfunction, a medical problem, or an error.

SUMMARY

An anomalous region detection method includes receiving time series data being grouped in patches, encoding, via parameters of an encoder, the data to obtain local latent representations for each patch, determining, for each patch, a representation loss from the local latent representations, transforming the local latent representations associated with each patch, via at least two local neural transformations, to a series of diverse transformed vector representations, determining a dynamic deterministic contrastive loss (DDCL) from the series of diverse transformed vector representations, combining the representation loss and the DDCL to obtain updated parameters, updating the parameters of the encoder with the updated parameters, scoring each of the series of the diverse transformed vector representations, via the DDCL, to obtain a diverse semantic requirement score associated with each patch, smoothing the diverse semantic requirement score to obtain a loss region, masking data associated with the loss region to obtain verified data, and outputting the verified data.

An anomalous region detection system includes a controller configured to, receive time series data, from a first sensor, the data being grouped in patches, encode, via parameters of an encoder, the data to obtain local latent representations for each patch, calculate, for each patch, a Contrastive Predictive Coding (CPC) loss from the local latent representations, transform the local latent representations associated with each patch, via at least two local neural transformations, to a series of diverse transformed vector representations, calculate a dynamic deterministic contrastive loss (DDCL) from the series of diverse transformed vector representations, combine the CPC loss and the DDCL to obtain updated parameters, update the parameters of the encode with the updated parameters, score each of the series of the diverse transformed vector representations, via the DDCL, to obtain a diverse semantic requirement score associated with each patch, smooth the diverse semantic requirement score to obtain a loss region, mask data associated with the loss region to obtain verified data, and operate a machine based on the verified data.

A telecommunication system includes a controller configured to, receive time series data being grouped in patches, encode, via parameters of an encoder, the data to obtain local latent representations for each patch, determining, for each patch, a Contrastive Predictive Coding (CPC) loss from the local latent representations, transform the local latent representations associated with each patch, via at least two local neural transformations, to a series of diverse transformed vector representations, calculate a dynamic deterministic contrastive loss (DDCL) from the series of diverse transformed vector representations, combine the CPC loss and the DDCL to obtain updated parameters, update the parameters of the encode with the updated parameters, score each of the series of the diverse transformed vector representations, via the DDCL, to obtain a diverse semantic requirement score associated with each patch, smooth the diverse semantic requirement score to obtain a loss region, mask data associated with the loss region to obtain verified data, and operate the telecommunication system based on the verified data.

DETAILED DESCRIPTION

Figure 1:
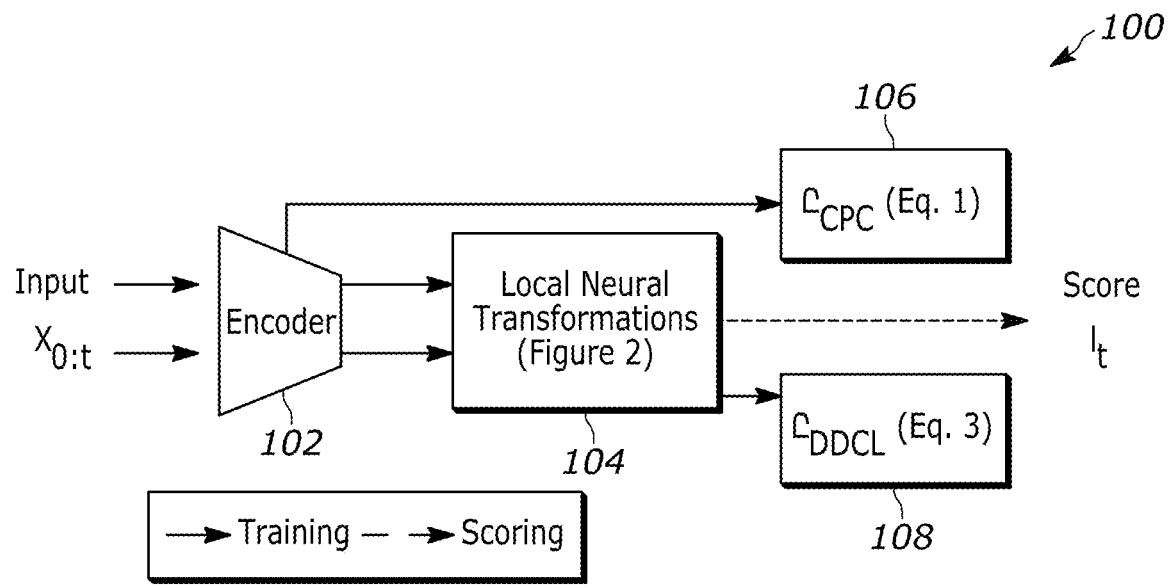
FIG. 1 is a flow diagram of an anomalous region detection system via Local Neural Transformations (LNT).

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

The term sensor refers to a device which detects or measures a physical property and records, indicates, or otherwise responds to it. The term sensor include an optical, light, imaging, or photon sensor (e.g., a charge-coupled device (CCD), a CMOS active-pixel sensor (APS), infrared sensor (IR), CMOS sensor), an acoustic, sound, or vibration sensor (e.g., microphone, geophone, hydrophone), an automotive sensor (e.g., wheel speed, parking, radar, oxygen, blind spot, torque, LIDAR), a chemical sensor (e.g., ion-sensitive field effect transistor (ISFET), oxygen, carbon dioxide, chemiresistor, holographic sensor), an electric current, electric potential, magnetic, or radio frequency sensor (e.g., Hall effect, magnetometer, magnetoresistance, Faraday cup, Galvanometer), an environment, weather, moisture, or humidity sensor (e.g., weather radar, actinometer), a flow, or fluid velocity sensor (e.g., mass air flow sensor, anemometer), an ionizing radiation, or subatomic particles sensor (e.g., ionization chamber, Geiger counter, neutron detector), a navigation sensor (e.g., a global positioning system (GPS) sensor, magneto hydrodynamic (MHD) sensor), a position, angle, displacement, distance, speed, or acceleration sensor (e.g., LIDAR, accelerometer, Ultra-wideband radar, piezoelectric sensor), a force, density, or level sensor (e.g., strain gauge, nuclear density gauge), a thermal, heat, or temperature sensor (e.g., Infrared thermometer, pyrometer, thermocouple, thermistor, microwave radiometer), or other device, module, machine, or subsystem whose purpose is to detect or measure a physical property and record, indicate, or otherwise respond to it.

Specifically, a sensor may measure properties of a time series signal and may include spatial or spatiotemporal aspects such as a location in space. The signal may include electromechanical, sound, light, electromagnetic, RF or other time series data. The technology disclosed in this application can be applied to time series imaging with other sensors, e.g., an antenna for wireless electromagnetic waves, microphone for sound, etc.

The term image refers to a representation or artifact that depicts perception of a physical characteristic (e.g., audible sound, visible light, Infrared light, ultrasound, underwater acoustics), such as a photograph or other two-dimensional picture, that resembles a subject (e.g., a physical object, scene, or property) and thus provides a depiction of it. An image may be multi-dimensional in that in may include components of time, space, intensity, concentration, or other characteristic. For example, an image may include a time series image. This technology can also be extended to image 3-D acoustic sources or objects.

Anomaly detection is applicable in a variety of system, such as medical equipment, security systems, consumer systems, automotive systems, autonomous driving systems, wireless communication systems, sensors, and defect detection in images using machine vision. It is often used in preprocessing to remove anomalous data from the data. In supervised learning, removing the anomalous data from the dataset often results in a statistically significant increase in accuracy.

Finding anomalous regions within a time series is important in many applications including consumer, medical, industry, automotive, and aviation. In this disclosure, auxiliary tasks based on data augmentation can be used to train a deep architecture, then the performance of the auxiliary tasks may be used as an anomaly score. This disclosure provides a solution to domains such as time series or tabular data. These domains benefit when the augmentations are learned from data. In this disclosure an approach to extend these methods to the task of finding anomalous regions within time series. This disclosure presents Local Neural Transformations (LNT), an end-to-end pipeline for detecting anomalous regions. It learns to embed and augment time series locally and produces an anomaly score for each time step. Via experiments it is shown that LNT can find synthetic noise in speech segments from the LibriSpeech data set. Although this disclosure focuses on time series (temporal), the concepts can be applied to other types of data such as spatial, or spatiotemporal.

Finding anomalous behavior in a time series is an important task in many applications of machine learning. An aspect of this disclosure is to use an unlabeled dataset of (potentially multivariate) time series and to learn a deep learning based approach that can scan new time series for anomalies. Specifically focusing on the task of anomalous region detection, such that the anomaly should be judged on a subsequence level rather than for a sequence as whole. In many applications this setup may be crucial in order to rapidly respond to anomalous behaviour.

In this disclosure, data augmentation is used to define tasks for training a deep feature extractor and the performance on the task is used as the anomaly score. Specifically, an improvement to adapt self-supervised anomaly detection to domains beyond images, deep methods for time series anomaly detection utilizing the benefits of data augmentation.

In this disclosure, a Local Neural Transformations (LNT), a transformation learning approach can be used for finding anomalies in time series data. Then an anomaly detection pipeline combines a feature extractor (such as a Contrastive Predictive Coding CPC) with neural transformation learning. Finally, a scoring method based on Hidden Markov Models (HMMs) combine scores and detect anomalous regions. This disclosure presents (1) a new method for self-supervised anomalous region detection in time series that combines representation and transformation learning, and (2) a scoring that combines different loss contributions into an anomaly score per time step.

Here, a Local Neural Transformations (LNT) can be applied as an anomaly detection method for time series, i.e. given a time series $x_{0:t} = (x_0, \ldots, x_t)^T \in R^{t+1}$ a method disclosed herein outputs scores '$_{0:t}$ representing an anomaly of each individual time step. An overview is given in FIG. 1, illustrating that neural transformations may be jointly trained with an encoder providing local representations with two contrastive self-supervision tasks. The performance on these tasks may be reused to derive an anomaly score $\ell_t^{(k,l)}$.

FIG. 1 is a flow diagram of an anomalous region detection system 100 via Local Neural Transformations (LNT). An encoder 102 via parameters internal to the encoder creates local latent representation of the data. That local latent representation is transformed via local neural transformations 104 to a series of diverse transformed vector representations. The encoder also outputs a representation loss 106, such as a CPC loss. And the local neural transformations 104 also output a dynamic deterministic contrastive loss (DDCL) 108.

Local Time Series Representations: The first step is to encode the time series to get local latent representations $z_t$. Also, representation losses are generated, these are losses that evaluate the quality of the representation such as a CPC loss, or an autoencoder loss. Time series patches $x_{t:t+\tau}$ (with window size $\tau$) are encoded by strided convolutions to obtain local latent representations $z_t$. Those are in turn processed by a recurrent model (GRU) to build context representations $c_t$. Both are trained with Contrastive Predictive Coding (CPC), which encourages the context embeddings $c_t$ to be predictive of nearby patches by contrasting linear k-step future predictions $W_k c_t$ against negative samples $z_j$ drawn from a proposal distribution Z. The resulting loss (equation 1) is the cross-entropy of classifying the positive sample from a fix sized set $Z\sim Z$ of negative samples with exponentiated similarity measures $f(z_i,z_j):=\exp z_i^\tau z_j$ and $f_k(z,c):=f(z,W_k c)$.

$$\mathcal{L}_{CPC} = -\mathbb{E}_{z}\left[\log\frac{f_k(z_{t+k}, c_t)}{\sum_{z_j \in Z} f_k(z_j, c_t)}\right] \quad (1)$$

where $\mathbb{E}$ is the Expectation function, $z_t$ is the local latent representations of the encoded time series, t is a time index, $W_k$ is a matrix of parameters where k is width of the time index, $f_k(a,b)=f(a,W_k b)$ is comparison function between its two arguments parameterized by $W_k$, $L_{CPC}$ is the Contrastive Predictive Coding (CPC) loss, $c_t$ is a context representation.

Local Neural Transformations: Next, the time series representations are processed by local neural transformations to produce different views of each embedding. These local transformations will allow for anomalous region detection.

Figure 2:
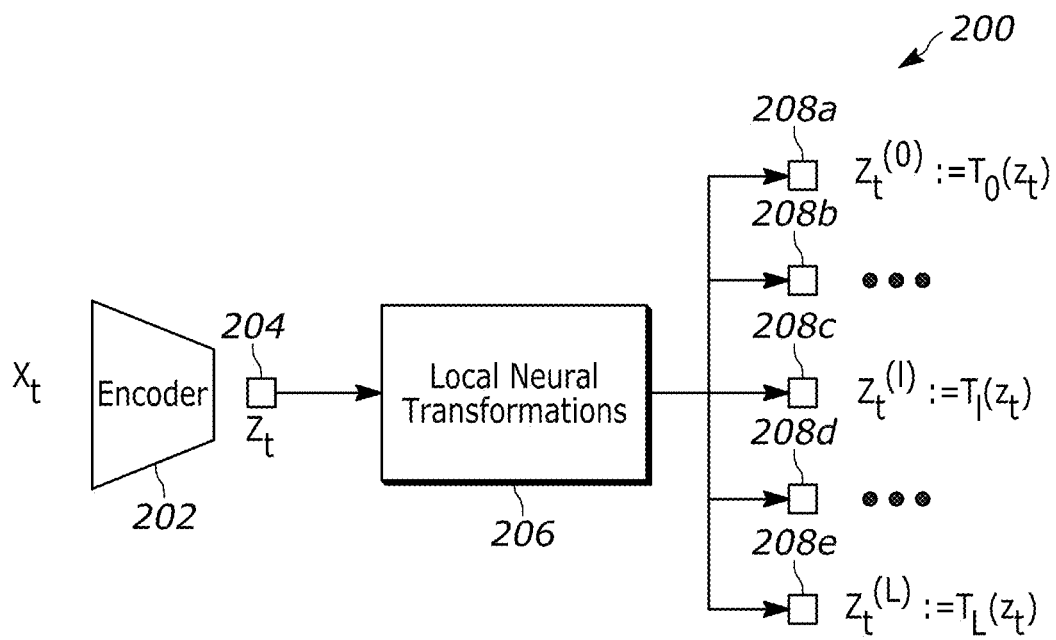
FIG. 2 is a flow diagram of Local Neural Transformations on latent representations.

FIG. 2 is a flow diagram of Local Neural Transformations 200 on latent representations. An encoder 202 via parameters internal to the encoder creates local latent representation 204 of the data. That local latent representation 204 is transformed via local neural transformations 206 to a series of diverse transformed vector representations 208 (208a, 208b, 208c, 208d, 208e).

For example, images semantic transformations could be rotations or color distortions while in one embodiment with other data, NeuTraL was used to learn a set of neural transformations $T_l(\cdot)$ with parameters $\theta_l$ from data by contrasting the original sample against different views of the same sample. This resulted in a deterministic contrastive loss since it did not rely on negative samples drawn from a noise distribution as in a Noise Contrastive Estimation (NCE).

This disclosure presents the application of this approach to learned latent representations $z_t$ as shown in FIG. 2 to acquire different latent views $T_l(z_t)$. Furthermore, this disclosure extend the loss with time-dependencies to a dynamic deterministic contrastive loss (DDCL) as given in equation 2 by incorporating future predictions $W_k c_t$ for different horizons k as positive samples.

$$\ell_t^{(k,l)} = \log\frac{h(z_{t+k}^{(l)}, W_k c_t)}{h(z_{t+k}^{(l)}, W_k c_t) + \sum_{m \neq l} h(z_{t+k}^{(l)}, z_{t+k}^{(m)})} \quad (2)$$

where $\ell_t^{(k,l)}$ is the score, $z_t$ is the local latent representations of the encoded time series, t is a time index, $W_k$ is a matrix of parameters where k is width of the time index, $$h(z_i, z_j) := \exp\frac{z_i^T z_j}{\|z_i\|\|z_j\|} \text{ is}$$

the cosine similarity function, and $c_t$ is a context representation.

This results in a sum (Equation 3) of different categorical cross-entropy losses (Equation 2) which all contrast the positive sample from $\{z_{t+k}^{(m)}|m \neq l\}$ given $z_{t+k}^{(l)}$ with cosine similarity measures $$h(z_i, z_j) := \exp\frac{z_i^T z_j}{\|z_i\|\|z_j\|}.$$

With this combine two self-supervision tasks, namely transformation learning and future prediction into a single deterministic contrastive loss, making the overall task more challenging since it has to deal with the variation induced by different k in $W_k c_t$.

$$L_{DDCL} = -\mathbb{E}_{z}\left[\sum_{k=1}^{K}\sum_{t}^{T}\sum_{i \in L} \ell_t^{(k,l)}\right] \quad (3)$$

where $\mathbb{E}$ is the Expectation function, t is a time index, k is width of the time index, l is the index of the transformation, $\ell_t^{(k,l)}$ is the score and $L_{DDCL}$ is the dynamic deterministic contrastive loss.

Finally, train the two objectives of equations 1 and equation 3 jointly with a unifying loss $L=L_{CPC}+\lambda L_{DDCL}$ with a hyper-parameter $\lambda$ balancing representation and transformation learning.

Transformation Learning Principles: As not every function learned from data creates a meaningful transformation (or view), This disclosure presents motivation of the architecture in FIG. 1 with three key principles that need to hold for learned transformations.

Two principles are (1) semantics and (2) diversity, which exclude common harmful edge-cases of transformation learning and helped to learn powerful transformations for tabular data. Enriching the first two, the third principle, (3) locality, provides the downstream task of anomalous region detection in mind:

Semantics are views produced by learned transformations that should share significant semantic information with the original sample.

Diversity are learned transformations that should produce diverse views for each sample, resulting in varietal and difficult self-supervision tasks that need strong semantic features to be solved.

Locality are transformations that should affect the data only in a local neighbourhood, while respecting the global context of the series.

Regarding locality, demand the performance of an induced self-supervision task to be locally sensitive to anomalous behavior within some global context of the series. With an emphasis that this is different than a simple sliding window approach, for that expect to detect "outlier windows" that are anomalous to the entire dataset, but not if they're only anomalous within the context of a particular series.

A key insight from CPC is that it decomposes the time series into local $z_t$ and global $c_t$ representations. This property may be exploited by applying neural transformations to $z_t$ only, yielding transformations that meet a principle of locality.

Figure 3:
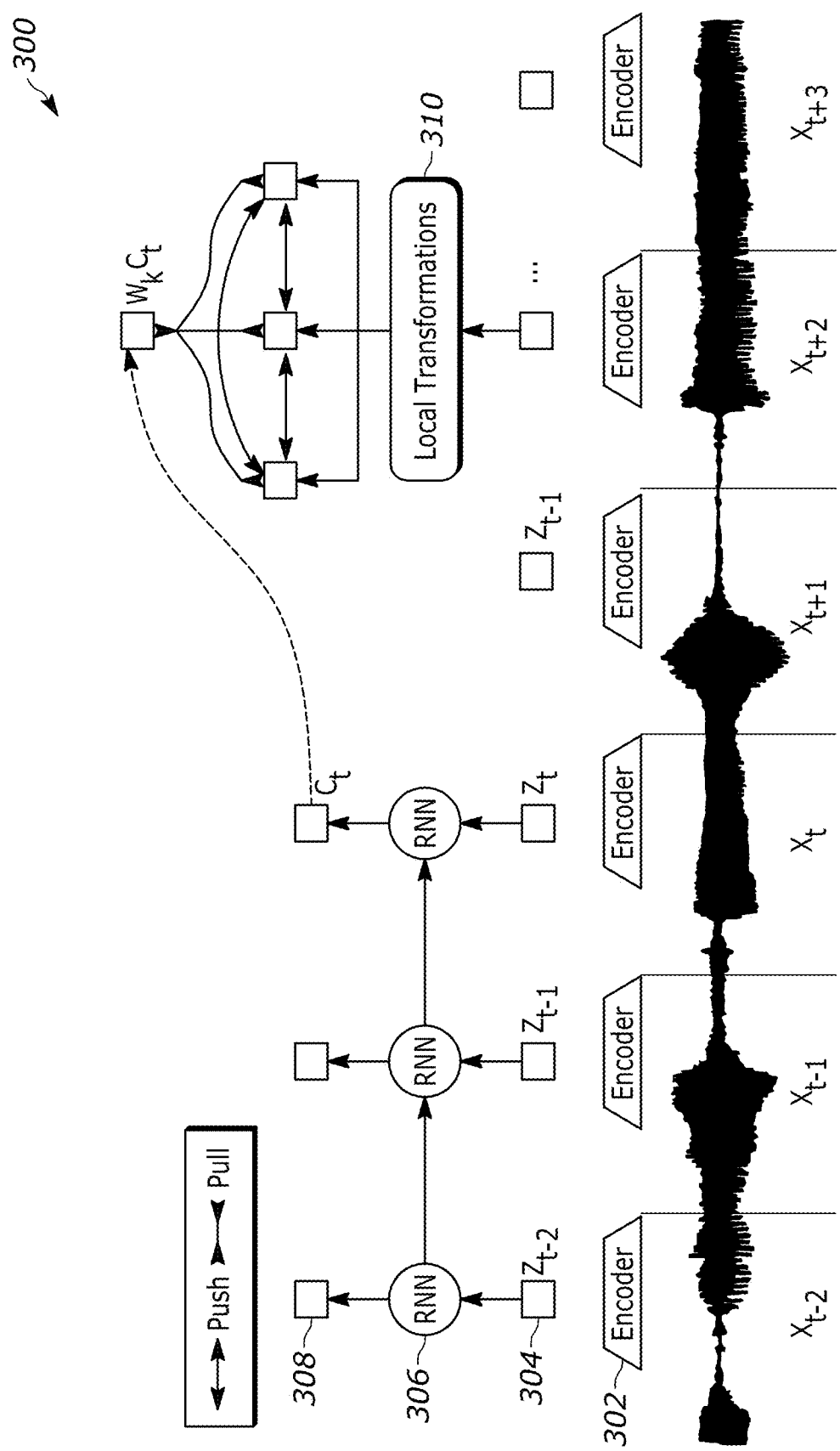
FIG. 3 is a flow diagram of a Dynamic Deterministic Contrastive Loss (DDCL) with push/pull in latent space.

From a different perspective, $L_{DDCL}$ can be interpreted as pushing and pulling different representations, as seen in FIG. 3, in latent space. The nominator of equation 2 pulls the learned transformations $z_{t+k}^{(t)}$ close to $W_k c_t$ ensuring the principle of semantics, while the denominator pushes different $z_{t+k}^{(m)}$ apart, ensuring diversity in the learned transformations.

Scoring of Anomalies: For scoring the anomaly of a particular point in time consider reuse of the $L_{DDCL}$ loss. This has the advantage of being deterministic and thus there is no need to draw negative samples from a proposal or noise distribution, as other contrastive self-supervision tasks may require.

Figure 4:
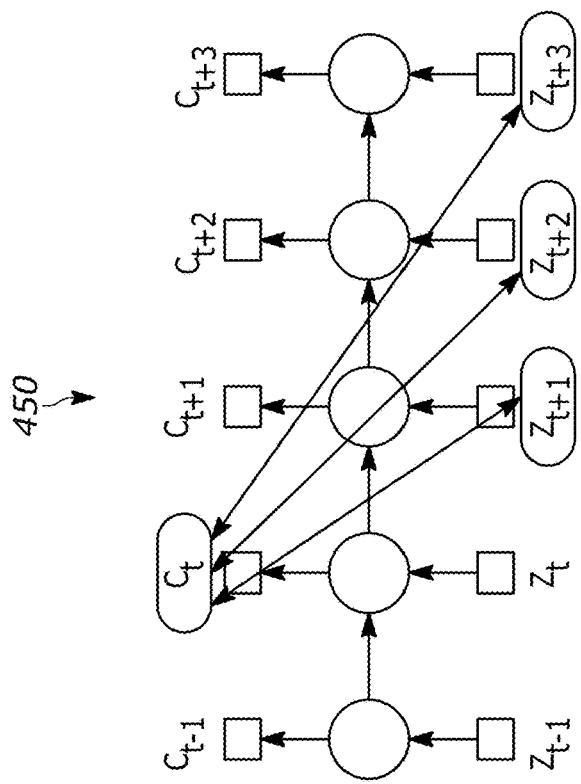
FIG. 4 is a flow diagram of forward and backward scoring.
Figure 4:
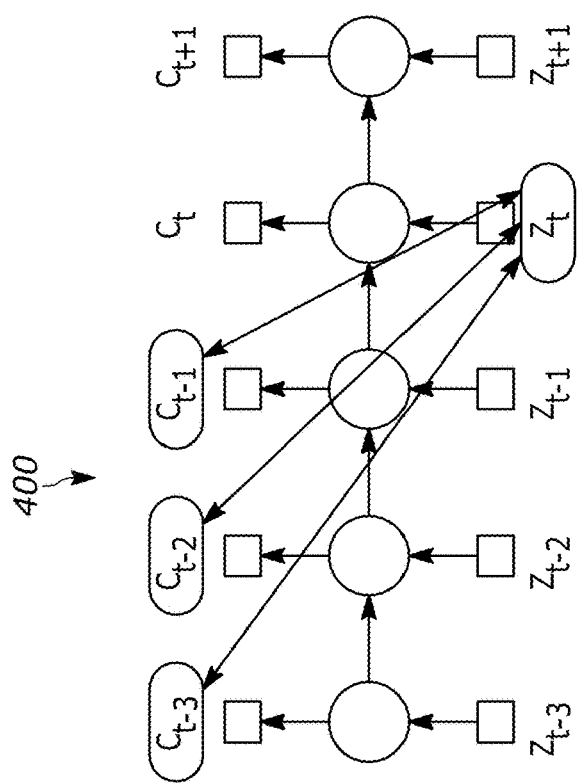

This allows for two possibilities to integrate time dependency into this approach to derive a score $`_t$ for time t, as depicted in FIG. 4:

FIG. 3 is a flow diagram of a Dynamic Deterministic Contrastive Loss (DDCL) 300 with push/pull in latent space. An encoder 302 via parameters internal to the encoder creates local latent representation 304 of the data. Note that this flow diagram illustrates the flow at different times for example, t, t−1, t−2, t+1, etc. That local latent representation 304 is transformed via local neural transformations 306, 310 to a series of diverse transformed vector representations 308. The local transformations 306, 308 are illustrated as a Recurrent Neural Network (RNN), but can also be implemented as a Convolutional Neural Network (CNN) or other neural transformation.

FIG. 4 is a flow diagram of forward scoring 400 and backward scoring 450.

Forward scoring uses a recorded history of global context states $c_{t-k}$ to contrast $W_k c_{t-k}$ with transformed representations $z_t^{(t)}$ at time t. This allows just in time computation of the score $`_t = \Sigma_{k=1}^{K} \Sigma_{l \in L} `_{t-k}^{(k,l)}$ once the current representation $z_t$ arrives.

Backward scoring uses upcoming future representations $z_{t+k}^{(l)}$ to update the score $s_t$ in hindsight. Hence, this method needs to wait for K future representations to arrive to score $`_t = \Sigma_{k=1}^{K} \Sigma^{l \in L} `_t^{(k,l)}$.

Note that during training these considerations are moot since all loss contributions are summed. Based on experiments in some embodiments, backward scoring smoothed and displaced the predictions compared to forward scoring. Therefore although both forward and backward scoring provided acceptable results, the examples below use forward scoring.

Figure 7:
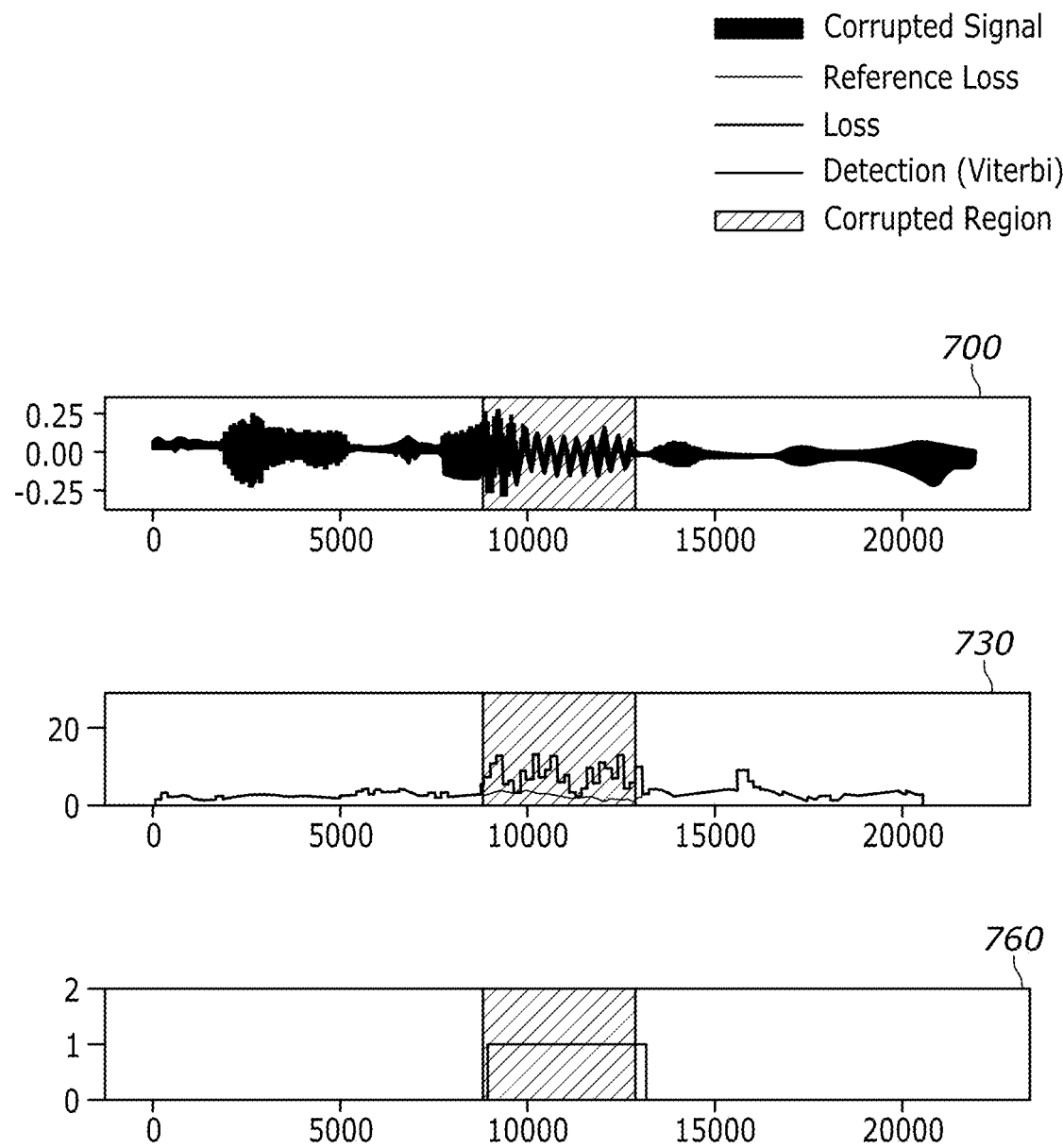
FIG. 7 is a graphical representation of an exemplary signal with an injected anomaly, a score, and error detection signal.
Figure 8:
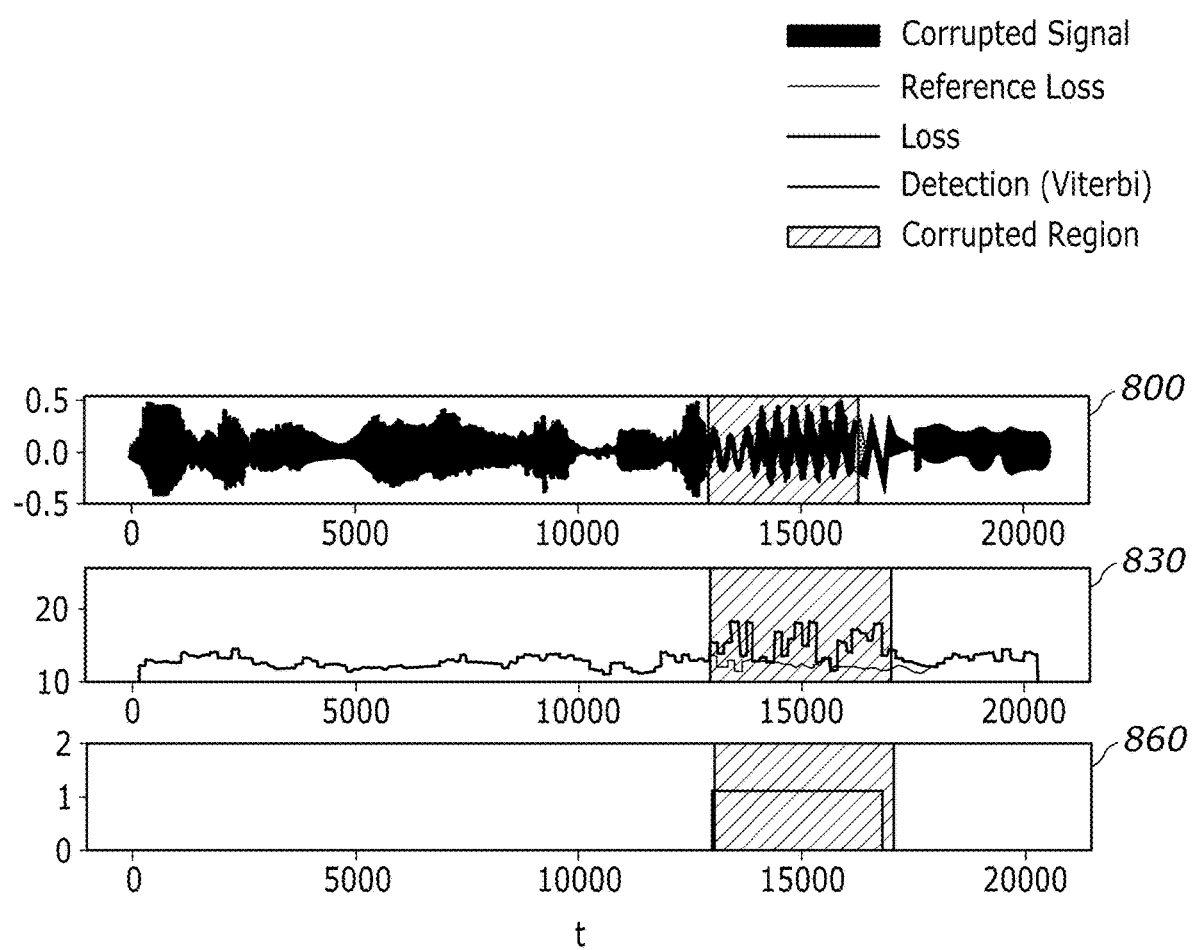
FIG. 8 is a graphical representation of an exemplary signal with an injected anomaly, a score, and error detection signal.

Hidden Markov Model: To derive a binary decision about an anomaly, one method would include comparing a threshold with each time point score $`_t$ separately. By exploiting the sequential nature of the data, another method is to use a downstream Hidden Markov Model (HMM) with binary states and extract the maximum likelihood state trajectory with Viterbi Decoding. This can smooth the outputs and help detect entire regions that are considered anomalous as shown in FIGS. 7 and 8.

Figure 5:
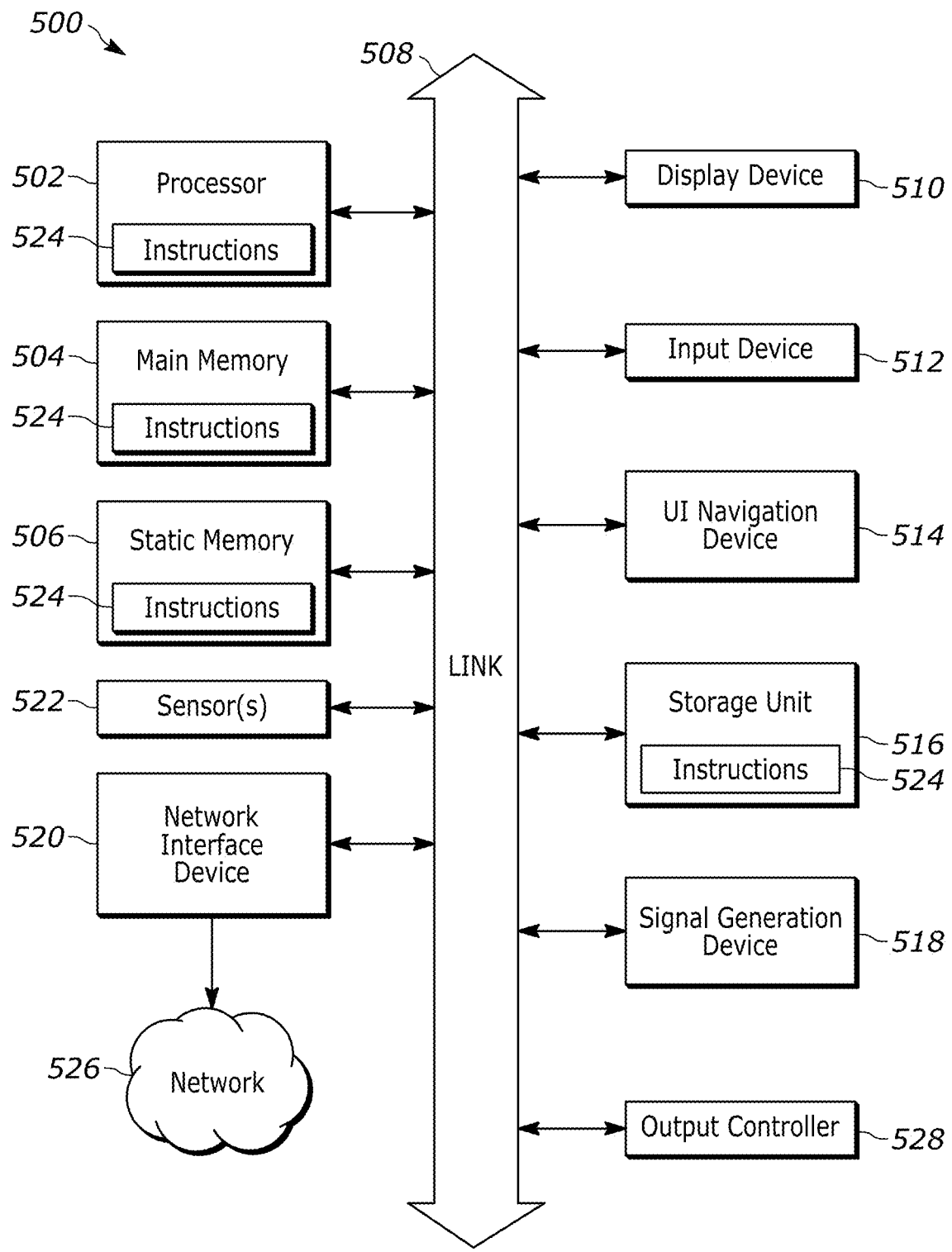
FIG. 5 is a block diagram of an electronic computing system.

Example telecommunication system, Machine Architecture and Machine-Readable Medium. FIG. 5 is a block diagram of an electronic computing system suitable for implementing the systems or for executing the methods disclosed herein. The machine of FIG. 5 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 5 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 500 includes at least one processor 502 (e.g., controller, microcontroller, a central processing unit (CPU), a graphics processing unit (GPU), tensor processing unit (TPU), advanced processing unit (APU), or combinations thereof), one or more memories such as a main memory 504 a static memory 506, or other types of memory, which communicate with each other via link 508. Link 508 may be a bus or other type of connection channel. The machine 500 may include further optional aspects such as a graphics display unit 510 comprising any type of display. The machine 500 may also include other optional aspects such as an alphanumeric input device 512 (e.g., a keyboard, touch screen, and so forth), a user interface (UI) navigation device 514 (e.g., a mouse, trackball, touch device, and so forth), a storage unit 516 (e.g., disk drive or other storage device(s)), a signal generation device 518 (e.g., a speaker), sensor(s) 521 (e.g., global positioning sensor, accelerometer(s), microphone(s), camera(s), and so forth), output controller 528 (e.g., wired or wireless connection to connect and/or communicate with one or more other devices such as a universal serial bus (USB), near field communication (NFC), infrared (IR), serial/parallel bus, etc.), and a network interface device 520 (e.g., wired and/or wireless) to connect to and/or communicate over one or more networks 526.

The various memories (i.e., 504, 506, and/or memory of the processor(s) 502) and/or storage unit 516 may store one or more sets of instructions and data structures (e.g., software) 524 embodying or utilized by any one or more of the methodologies or functions described herein. These instructions, when executed by processor(s) 502 cause various operations to implement the disclosed embodiments.

Exemplary Experiments: The LibriSpeech dataset was used with artificial anomaly regions in order to demonstrate proof of concept and also compare the benefit of certain design choices.

The test data was randomly place additive pure sine tones of varying frequency and length in the dataset, yielding consecutive anomaly regions that make up ≈10% of the data.

A CPC hyperparameters was used in which $c_t \in R^{256}$, $z_t \in R^{512}$ and K=12. Additionally, train L=12 distinct learned transformations $T_l(z_t)$. Each consists of an MLP with 3 hidden layers of size 64, ReLU activations and without bias terms, which are applied as a residual multiplicative masks with sigmoid activations to the input $z_t$. For the joint training, pretrain for 30 epochs detached and choose $\lambda=0.1$ afterwards. During detached training prevent the gradient flow from neural transformations to representations, i.e. train both parts individually.

LSTM, THOC as deep learning baselines and OC-SVM, LOF as classical baselines were used. The latter are not especially designed for time series, so features were extracted from a sliding window of fixed size and applied to the detection to them. These features should be invariant under translation. For speech data, mel-scaled spectrograms are shown to be powerful domain-specific features.

Results: The anomaly scores predicted by the algorithms for each time step individually were compared. Consider sub-series of length 20480 resulting in as many scores and decisions per sample, and overall $\approx 10^8$ for the entire test-set. For baseline algorithms that rely on a smaller window size, stitch the results from several sub-windows.

Comparing the LNT presented in this disclosure with several baselines using the Receiver Operating Characteristic (ROC) curves reported in FIG. 6A. LNT outperformed all deep learning methods that rely on learned representations, and performed on par with OCSVM which relies on domain specific features. Although these features are especially well suited for this particular anomalies that rely on pure frequencies, The LNT presented in this disclosure can be applied to other task where no strong domain specific features exist.

Figure 6:
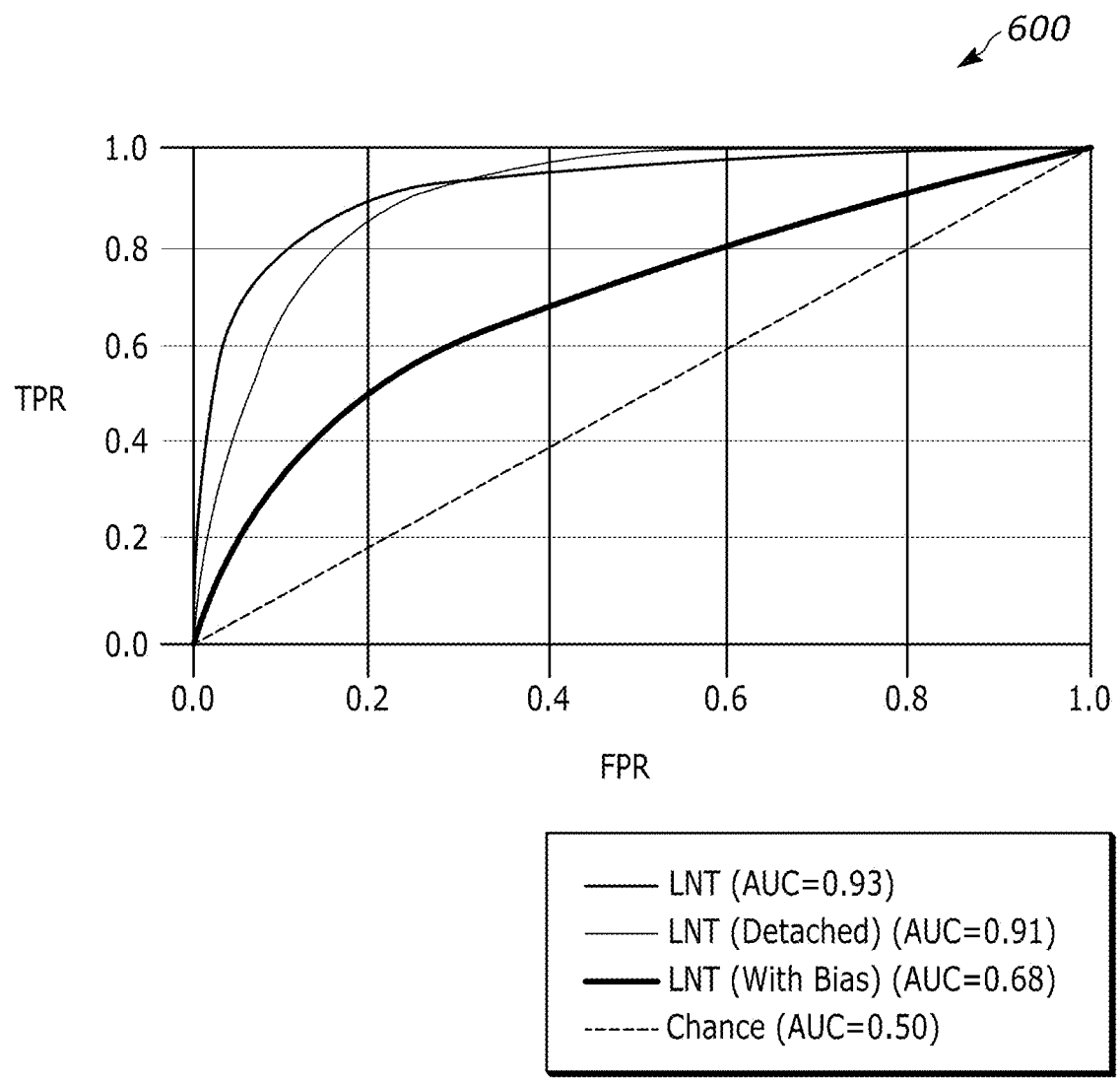
FIG. 6 is a graphical representation of a Receiver Operating Characteristic (ROC) curve of Local Neural Transformations (LNT) illustrating True Positive Rate (TPR) in relation to False Positive Rate (FPR) for different design choices.

FIG. 6 illustrates the effect of two different design choices on the anomaly detection performance while keeping the other hyper-parameters fixed, namely detached training and bias terms: Solely training detached causes an inferior anomaly detection. Thus joint training influences the learned representation in a positive way, not only resulting in a lower loss after training, but also in a better anomaly detection. An even stronger effect can be accounted to the presence of bias terms in LNT. Bias terms make the learned transformations independent of the input to some degree by design. This causes the performance of the self-supervision task to also be invariant under various inputs, which breaks the semantics principle of this anomaly detection method.

FIG. 6 is a graphical representation of a Receiver Operating Characteristic (ROC) curve 600 of Local Neural Transformations (LNT) illustrating True Positive Rate (TPR) in relation to False Positive Rate (FPR) for different design choices.

This disclosure presents an LNT method, an anomaly region detection method for time series that combines representation and transformation learning in a new way. Further, this disclosure provides results that show that this system and method is capable to detect anomalous regions within a time series and also outperforms common deep learning baselines that also acquire data representations, rather then relying on domain specific features.

Although not expressly discussed in this disclosure, the systems and methods disclosed can be applied to other time series datasets with annotated anomalies. Especially datasets with context dependent anomalies, spatial, or spatial-temporal datasets.

Neural Transformation Learning: Extending a self-supervised anomaly detection method for domains beyond images. It recently showed promising results on tabular data, but is yet missing an extension to detect anomalous regions within time series. We quickly review the key ideas in the following:

Consider to augment data D by learned transformations $x_k:=T_k(x)$ with parameters trained by a Deterministic Contrastive Loss (DCL) (see equation 4). This loss encourages transformed samples to be similar, with respect to cosine similarity $h(\cdot)$, to its original sample, while being dissimilar to other views of the same sample, which is motivated with semantics and diversity.

$$\mathcal{L} := \mathbb{E}_{x \sim D}\left[-\sum_{k=1}^{K}\log\frac{h(x_k, x)}{h(x_k, x) + \sum_{l \neq k}h(x_k, x_l)}\right] \quad (4)$$

The ability to contrast these different views of data is expected to decrease for anomalous data, yielding a deterministic anomaly score by reusing L. One key advantage over previous anomaly detection methods relying on data augmentations is that learned transformations are also applicable in domains where it's unclear how to design semantic augmentations manually.

Viterbi Decoding in Hidden Markov Model (HMM): To derive a binary decision from the evaluation of the self-supervision task, consider a Hidden Markov Model (HMM) with two states. The HMM states $s_t$ therefore correspond to the condition whether the current time step t is part of an anomalous region. Then view the scores $\ell_t$ as emissions of that generative probabilistic model. The emission probabilities are chosen as Gaussian density with a mean at the value of $L_{DDCL}$ after training and respectively higher for the anomaly state. This design choice is motivated by distribution of $\ell_t$ which is characterized by a bi-modality.

In order to further exploit the sequential nature of the data, the state transition probabilities are chosen to favor continuity. One method is to extract the maximum-likelihood state trajectory from that network with the help of Viterbi Decoding.

Results for randomly selected samples from the test set are reported in FIGS. 7 and 8. These plots show samples from the test set with an artificial anomalies placed at the yellow shaded area in the top row, below $L_{DDCL}$ loss yielded by LNT. The baseline denoted with reference loss is the output when the same sample without corruptions is fed. Note that this baseline is just for visualization purposes and is no input to any of the methods.

Viterbi Decoding can overcome the effect that the performance of the contrastive self-supervision task varies on anomalous regions, by extracting a continuous anomaly decision sequence with few jumps, as shown in the bottom row. For the selected samples the anomalous region is almost perfectly detected.

FIG. 7 is a graphical representation of an exemplary signal with an injected anomaly 700. The corrupt region is the area in which an anomaly was injected into the data stream. The graphical representation of a score 730, illustrates $\ell_t^{(k,l)}$ which is the score or also referred to as diverse semantic requirement score. The graphical representation of an error detection signal 760 also referred to as the loss region.

FIG. 8 is a graphical representation of an exemplary signal with an injected anomaly 800. The corrupt region is the area in which an anomaly was injected into the data stream. The graphical representation of a score 830, illustrates $\ell_t^{(k,l)}$ which is the score or also referred to as diverse semantic requirement score. The graphical representation of an error detection signal 860 also referred to as the loss region.

Reliable detection of anomalies is crucial when deploying machine learning models in practice, but remains challenging due to the lack of labeled data. The use of contrastive learning approaches may be used in general self-supervised representation learning settings. Here, a contrastive anomaly detection approach is applied to images and configured to provide interpretable results in the form of anomaly segmentation masks. In this section of the disclosure the use of a Contrastive Predictive Coding model is presented. This disclosure presents a patch-wise contrastive loss that can directly be interpreted as an anomaly score, and is used in the creation of anomaly segmentation masks. The resulting model was tested for both anomaly detection and segmentation on the challenging MVTec-AD dataset.

An anomaly (or outlier, novelty, out-of-distribution sample) is an observation that differs significantly from the vast majority of the data. Anomaly detection (AD) tries to distinguish anomalous samples from the samples that are deemed 'normal' in the data. It has become increasingly relevant to detect these anomalies to make machine learning methods more reliable and to improve their applicability in real-world scenarios, for example, in automated industrial inspections, medical diagnosis, or autonomous driving. Typically, anomaly detection is treated as an unsupervised learning problem, since labelled data is generally unavailable and to develop methods that can detect previously unseen anomalies.

In this disclosure, a Contrastive Predictive Coding (CPC) method and system can be applied to detect and segment anomalies in images. Further, this system applies a representation loss (e.g., InfoNCE loss) that is can be directly interpreted as an anomaly score. Since in this loss patches from within an image are contrasted against one another, these can be used to create accurate anomaly segmentation masks.

Figure 9:
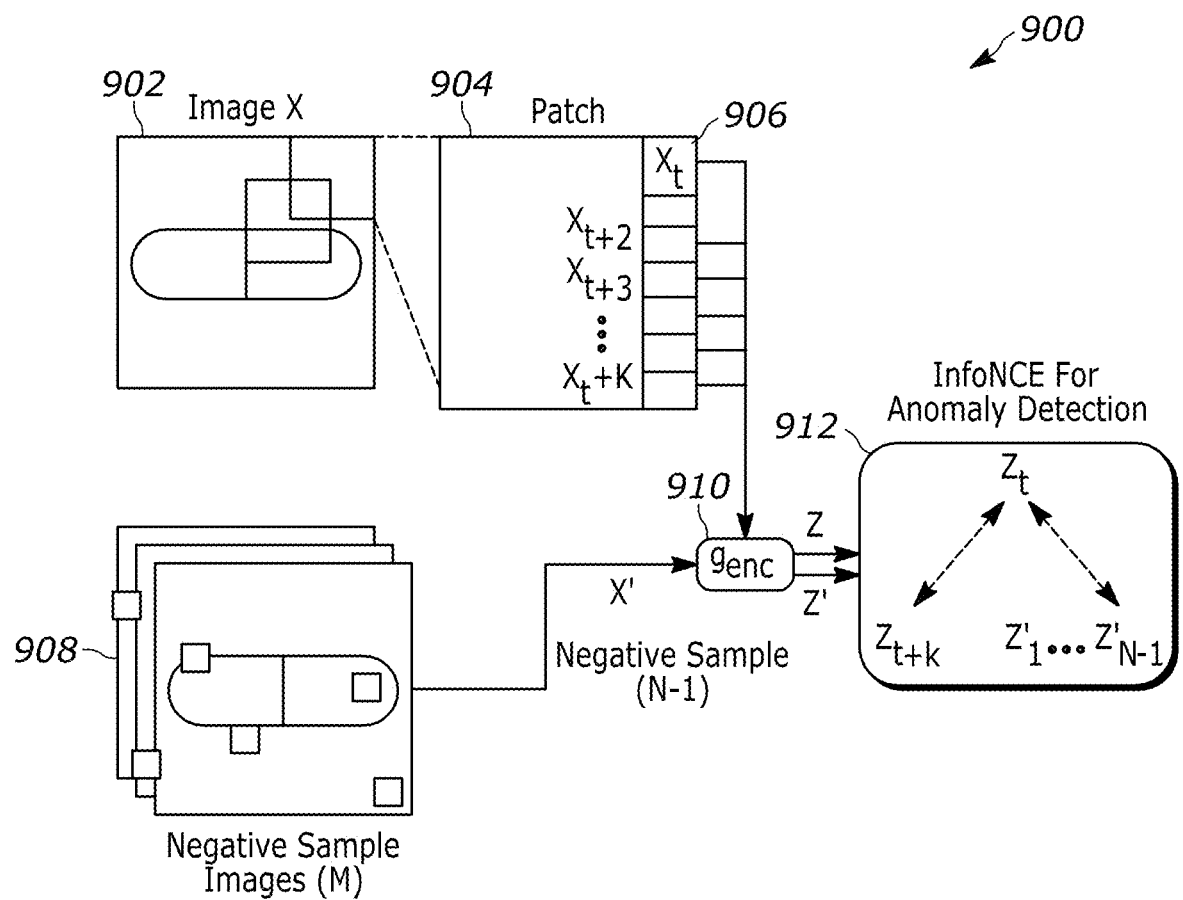
FIG. 9 is a flow diagram of anomalous region detection system via Contrastive Predictive Coding (CPC).

FIG. 9 is a flow diagram of anomalous region detection system 900 via Contrastive Predictive Coding (CPC). An Image 902 is grouped into patches 904 with data within each patch 906 is encoded by an encoder 910 to create local latent representations. The encoder may include negative samples 908 when to calculating the local latent representations. The local latent representations pass through a local neural transformation 912 to create to a series of diverse transformed vector representations, and a dynamic deterministic contrastive loss (DDCL) that are both used to create a diverse semantic requirement score associated with each patch.

A schematic overview of Contrastive Predictive Coding for anomaly detection and segmentation in images. After extracting (sub-)patches from the input image, we contrast the encoded representations from within the same image ($z_t, z_{t+k}$) against N−1 randomly matched representations ($z_t, z_j$). The resulting InfoNCE loss is used to determine whether sub-patch $x_{t+k}$ is anomalous or not.

Figure 10:
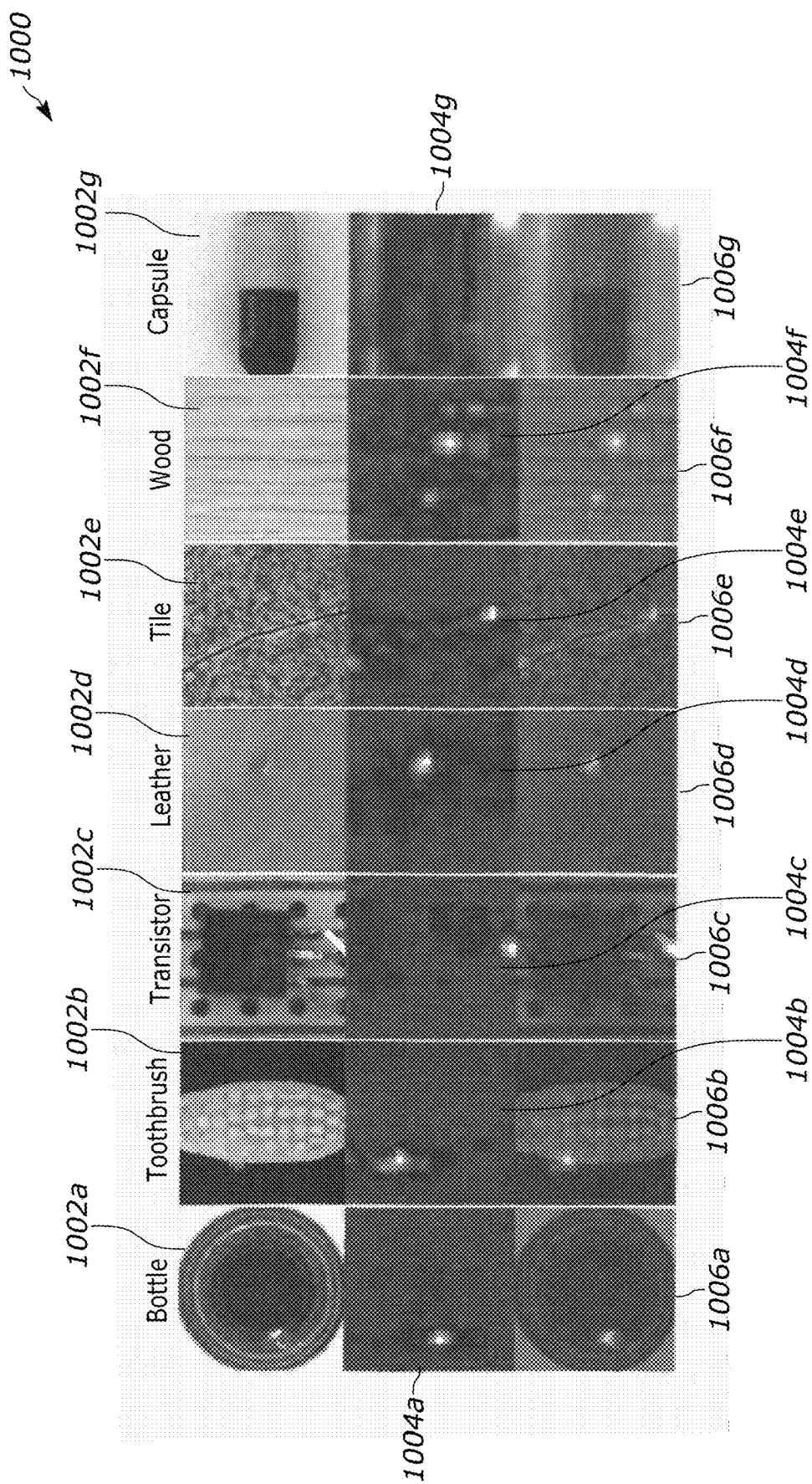
FIG. 10 is an illustration of images, corresponding Contrastive Predictive Coding (CPC) loss values, and superposition of both image and loss values.

FIG. 10 is an illustration of images 1000, illustrating localization of anomalous regions for different classes in the MVTec-AD dataset. The original input images 1002 (1002a, 1002b, 1002c, 1002d, 1002e, 1002f, 1002g), the corresponding InfoNCE loss values 1004 (1004a, 1004b, 1004c, 1004d, 1004e, 1004f, 1004g) (lighter shade represent higher loss values) and the superimposition of both 1006 (1006a, 1006b, 1006c, 1006d, 1006e, 1006f, 1006g). This illustrates that the model presented in this disclosure consistently highlights anomalous regions across many classes.

To improve the performance of the CPC model for anomaly detection, this disclosure includes two adjustments. First, adapt the setup of negative samples during testing such that anomalous patches can only appear within the positive sample. Second, omit the autoregressive part of the CPC model. With these adjustments, this presented method achieves promising performance on real-world data, such as the challenging MVTec-AD dataset.

Contrastive Learning:

Self-supervised methods based on contrastive learning work by making a model decide whether two (randomly or pseudo-randomly) transformed inputs originated from the same input sample, or from two samples that have been randomly drawn from across the dataset. Different transformations can be chosen depending on the domain and downstream task. For example, on image data, random data augmentation such as random cropping and color jittering is considered. In this disclosure, a Contrastive Predictive Coding model makes use of temporal transformations. These approaches were evaluated by training a linear classifier on top of the created representations and by measuring the performance that this linear classifier achieved on downstream tasks.

Anomaly Detection:

Anomaly detection methods can roughly be divided into three categories: density-based, reconstruction-based and discriminative-based methods. Density-based methods predict anomalies by estimating the probability distribution of the data (e.g. GANs, VAEs, or flow-based models). Reconstruction-based methods are based on models that are trained with a reconstruction objective (e.g. autoencoders). Discriminative-based methods learn a decision boundary between anomalous and normal data (e.g. SVM, one-class classification). The method proposed in this disclosure include but are not limited to a density-based method with a discriminative one-class objective.

Contrastive Predictive Coding:

Contrastive Predictive Coding is a self-supervised representation learning approach that leverages the structure of the data and enforces temporally nearby inputs to be encoded similarly in latent space. It achieves this by making the model decide whether a pair of samples is made up of temporally nearby samples or randomly assigned samples. This approach can also be applied to static image data by splitting the images up into patches, and interpreting each row of patches as a separate time-step.

The CPC model makes use of a contrastive loss function, including one known as InfoNCE, that is based on Noise-Contrastive Estimation and is designed to optimize the mutual information between the latent representations of patches ($z_t$) and their surrounding patches ($c_{t+k}$):

$$\mathcal{L}_k = -\mathbb{E}_X \left[ \log \frac{\exp(z_{t+k}^T W_k c_t)}{\sum_X \exp(z_j^T W_k c_t)} \right] \tag{5}$$

where $z_t = g_{enc}(x_t)$ and $g_{enc}$ represents a non-linear encoder, $c_t = g_{ar}(z_{\le t})$ and $g_{ar}$ represents an autoregressive model. Furthermore, $W_k$ describes a linear transformation used for predicting k time-steps ahead. The set of samples X consists of one positive sample ($x_t, x_{t+k}$) and N−1 negative samples ($x_t, x_j$) for which $x_j$ is randomly sampled from across the current batch.

CPC for Anomaly Detection:

Apply the CPC model for anomaly detection and segmentation. To improve the performance of the CPC model in this setting, consider two adjustments to its architecture (see FIG. 9). First, omit the autoregressive model $g_{ar}$. As a result, the loss function changes to:

$$\mathcal{L}_k = -\mathbb{E}_X \left[ \log \frac{\exp(z_{i+k}^T W_k z_i)}{\sum_X \exp(z_j^T W_k z_t)} \right] \quad (6)$$

where $\mathbb{E}$ is the Expectation function, $z_t$ is the local latent representations of the encoded time series, t is a time index, $W_k$ is a matrix of parameters where k is width of the time index, exp(a) is the exponential function, Lx is the Contrastive Predictive Coding (CPC) loss, $c_t$ is a context representation.

This adjustment results in a simpler model, while still being able to learn useful latent representations. Second, change the setup of the negative samples during testing. One implementation of the CPC model use random patches from within the same test-batch as negative samples. However, this may result in negative samples containing anomalous patches, which could make it harder for the model to detect anomalous patches in the positive sample. To avoid this, consider a new sampling approach that makes use of a subset of non-anomalous images of the training set.

In the test-phase, the loss function in Eq. (6) can be used to decide whether an image patch xt+k can be classified as anomalous:

$$x_{t+k} = \begin{cases} \text{anomalous,} & \text{if } \mathcal{L}_k \geq \tau \\ \text{normal,} & \text{if } \mathcal{L}_k < \tau \end{cases} \quad (7)$$

The threshold value T remains implicit, and the area under the receiver operating characteristic curve (AUROC) can be used as performance measure. One solution is to create anomaly segmentation masks by making use of the anomaly scores per patch $x_{t+k}$, another is to decide whether a sample is anomalous by averaging over the scores of the patches within an image.

Experiments:

The proposed Contrastive Predictive Coding model for anomaly detection and segmentation was evaluated on the MVTec-AD dataset. This dataset contains high-resolution images of ten objects and five textures with pixel-accurate annotations and provides between 60 and 391 training images per class. Next, randomly crop every image to 768×768 pixels and split it into patches of size 256×256, where each patch has 50% overlap with its neighbouring patches. These patches are further divided into sub-patches of size 64×64, also with 50% overlap. These sub-patches are used in the InfoNCE loss (FIG. 1) to detect anomalies. The cropped images are horizontally flipped with a probability of 50% during training.

Then a ResNet-18 v2 was used up until the third residual block as encoder $g_{enc}$. A separate model was trained from scratch for each class with a batch size of 16 for 150 epochs using the Adam optimizer with a learning rate of 1.5e-4. The model was trained and evaluated on grayscale images. To increase the accuracy of the InfoNCE loss as an indicator for anomalous patches, apply the model in two directions. Both from the top row of the image to the bottom row and from the bottom row to the top row—using a shared encoder, but separate $W_k$, for each direction.

Anomaly Detection

The performance of the proposed model for detecting anomalies was evaluated by averaging the top-5% InfoNCE loss values across all sub-patches within a cropped image and use this value to calculate the AUROC score. Table 1 is an exemplary comparison including systems that do not make use of pre-trained feature extractors. The proposed CPC-AD model substantially improves upon a kernel density estimation model (KDE) and an auto-encoding model (Auto). Although the performance of the model presented in this disclosure lags behind the Cut-Paste model, CPC-AD provides a more generally applicable approach for anomaly detection. The Cut-Paste model relies heavily on randomly sampled artificial anomalies that are designed to resemble the anomalies encountered in the dataset. As a result, it is not applicable to a k-classes-out task, where anomalies differ semantically from the normal data.

TABLE 1

Anomaly detection AUROC score on the MVTec-AD test-set per category. The proposed CPC-AD approach substantially outperforms the kernel density estimation model (KDE) and the autoencoding model (Auto). It is outperformed by the CutPaste model which relies heavily on dataset-specific augmentations for its training.

|  | KDE | Auto | CutPaste | CPC-AD |
| --- | --- | --- | --- | --- |
| Bottle | 0.833 | 0.950 | 0.983 | 1.000 |
| Cable | 0.669 | 0.573 | 0.806 | 0.948 |
| Capsule | 0.562 | 0.525 | 0.962 | 0.559 |
| Carpet | 0.348 | 0.368 | 0.931 | 0.785 |
| Grid | 0.717 | 0.746 | 0.999 | 0.978 |
| Hazelnut | 0.699 | 0.905 | 0.973 | 0.891 |
| Leather | 0.415 | 0.640 | 1.000 | 0.977 |
| Metal nut | 0.333 | 0.455 | 0.993 | 0.719 |
| Pill | 0.691 | 0.760 | 0.924 | 0.967 |
| Screw | 0.369 | 0.779 | 0.863 | 0.756 |
| Tile | 0.689 | 0.518 | 0.934 | 0.903 |
| Toothbrush | 0.933 | 0.494 | 0.983 | 0.967 |
| Transistor | 0.724 | 0.512 | 0.955 | 0.935 |
| Wood | 0.947 | 0.885 | 0.986 | 0.714 |
| Zipper | 0.614 | 0.350 | 0.994 | 0.966 |
| Mean | 0.636 | 0.631 | 0.952 | 0.873 |

Anomaly Segmentation:

For the evaluation of the proposed CPC-AD model's anomaly segmentation performance, up-sample the sub-patch-wise InfoNCE loss values to match the pixel-wise ground truth annotations. Average the InfoNCE losses of overlapping sub-patches and assign the resulting values to all affected pixels. Create anomaly segmentation masks at the resolution of half a sub-patch (32×32 pixels) that are of the same dimensions as the cropped images (768×768).

Table 2, is an exemplary comparison of the anomaly segmentation performance of the proposed CPC-AD method. The best results on the MVTec-AD dataset are achieved with extensive models that are pre-trained on ImageNet, such as FCDD and PaDiM, or that make use of additional artificial anomalies and ensemble methods, such as CutPaste. The model presented in this disclosure is trained from scratch and uses merely the provided training data, making for a less complex and more general method. The proposed CPC-AD approach is further outperformed by two auto-encoding approaches (AE-SSIM, AE-L2) and a GAN-based approach (AnoGAN).

The model presented in this disclosure succeeds in generating accurate segmentation masks for a large amount of images across most classes (FIG. 10). Even for classes with a low pixel-wise AUROC score, such as the transistor, it can be seen that the created segmentation masks correctly highlight anomalous input regions. This corresponds with the comparatively high detection performance that the CPC-AD method achieves for this class (Table 1). These results indicate that part of the low segmentation scores (compared to the detection scores) could be due to small spatial deviations from the ground truth. This effect might be exacerbated by the relatively low resolution of the segmentation masks that this patch-wise approach creates.

TABLE 2

Anomaly segmentation-pixelwise AUROC score on the MVTec-AD test-set per category. AE-SSIM and AE-L2, AnoGAN and CutPaste, as well as the presented CPC-AD model that does not use a pre-trained feature extractor. FCDD and PaDiM use pre-training to improve their results (denoted with an *).

|  | AE-SSIM | AE-L2 | AnoGAN | CutPaste | FCDD* | PaDiM* | CPC-AD |
|---|---|---|---|---|---|---|---|
| Bottle | 0.93 | 0.36 | 0.86 | 0.98 | 0.97 | 0.98 | 0.84 |
| Cable | 0.82 | 0.86 | 0.78 | 0.9 | 0.9 | 0.97 | 0.77 |
| Capsule | 0.94 | 0.88 | 9.84 | 0.97 | 0.93 | 0.99 | 0.41 |
| Carpet | 0.87 | 0.59 | 0.54 | 0.98 | 0.96 | 0.99 | 0.7 |
| Grid | 0.94 | 0.9 | 0.58 | 0.98 | 0.91 | 0.97 | 0.72 |
| Hazelnut | 0.97 | 0.95 | 0.87 | 0.97 | 0.95 | 0.98 | 0.59 |
| Leather | 0.78 | 0.75 | 0.64 | 1.0 | 0.98 | 0.99 | 0.86 |
| Metal nut | 0.89 | 0.86 | 0.76 | 0.93 | 0.94 | 0.97 | 0.67 |
| Pill | 0.91 | 0.85 | 0.87 | 0.96 | 0.81 | 0.96 | 0.75 |
| Screw | 0.96 | 0.96 | 0.8 | 0.97 | 0.86 | 0.99 | 0.66 |
| Tile | 0.59 | 0.51 | 0.5 | 0.91 | 0.91 | 0.94 | 0.72 |
| Toothbrush | 0.92 | 0.93 | 0.9 | 0.98 | 0.94 | 0.99 | 0.89 |
| Transistor | 0.9 | 0.86 | 0.8 | 0.93 | 0.88 | 0.98 | 0.53 |
| Wood | 0.73 | 0.73 | 0.62 | 0.96 | 0.88 | 0 95 | 0.71 |
| Zipper | 0.88 | 0.77 | 0.78 | 0.99 | 0.92 | 0.99 | 0.76 |
| Mean | 0.87 | 0.82 | 0.74 | 0.96 | 0.92 | 0.98 | 0.71 |

Overall, the CPC-AD model shows that contrastive learning can be applied not just for anomaly detection, but also for anomaly segmentation. The proposed method performs well on the anomaly detection task, with competitive results for a majority of the data. Additionally—despite the fact that the model is still outperformed by most recent segmentation methods—the generated segmentation masks provide a promising first step towards anomaly segmentation methods that are based on contrastive learning.

FIGS. 11-16 illustrate exemplary embodiments however the concepts of this disclosure may be applied to additional embodiments. Some exemplary embodiments include: Industrial applications in which the modalities may include video, weight, IR, 3D camera, and sound; power tool or appliance applications in which the modalities may include torque, pressure, temperature, distance, or sound; medical applications in which the modalities may include ultrasound, video, CAT scan, MRI, or sound; robotic applications in which the modalities may include video, ultrasound, LIDAR, IR, or Sound; and security applications in which the modalities may include video, sound, IR, or LIDAR. The modalities may have diverse datasets for example, a video dataset may include an image, a LIDAR dataset may include a point cloud, and an microphone dataset may include a time series.

Figure 11:
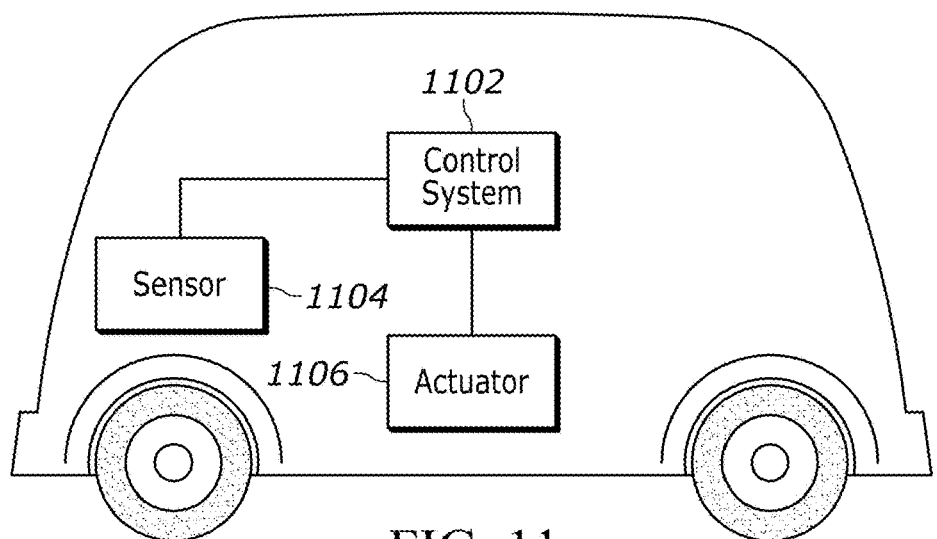
FIG. 11 is a schematic diagram of a control system configured to control a vehicle.

FIG. 11 is a schematic diagram of control system 1102 configured to control a vehicle, which may be an at least partially autonomous vehicle or an at least partially autonomous robot. The vehicle includes a sensor 1104 and an actuator 1106. The sensor 1104 may include one or more wave energy based sensor (e.g., a Charge Coupled Device CCD, or video), radar, LiDAR, microphone array, ultrasonic, infrared, thermal imaging, acoustic imaging or other technologies (e.g., positioning sensors such as GPS). One or more of the one or more specific sensors may be integrated into the vehicle. Alternatively or in addition to one or more specific sensors identified above, the control module 1102 may include a software module configured to, upon execution, determine a state of actuator 1104.

In embodiments in which the vehicle is an at least a partially autonomous vehicle, actuator 1106 may be embodied in a brake system, a propulsion system, an engine, a drivetrain, or a steering system of the vehicle. Actuator control commands may be determined such that actuator 1106 is controlled such that the vehicle avoids collisions with detected objects. Detected objects may also be classified according to what the classifier deems them most likely to be, such as pedestrians or trees. The actuator control commands may be determined depending on the classification. For example, control system 1102 may segment an image (e.g., optical, acoustic, thermal) or other input from sensor 1104 into one or more background classes and one or more object classes (e.g. pedestrians, bicycles, vehicles, trees, traffic signs, traffic lights, road debris, or construction barrels/cones, etc.), and send control commands to actuator 1106, in this case embodied in a brake system or propulsion system, to avoid collision with objects. In another example, control system 1102 may segment an image into one or more background classes and one or more marker classes (e.g., lane markings, guard rails, edge of a roadway, vehicle tracks, etc.), and send control commands to actuator 1106, here embodied in a steering system, to cause the vehicle to avoid crossing markers and remain in a lane. In a scenario where an adversarial attack may occur, the system described above may be further trained to better detect objects or identify a change in lighting conditions or an angle for a sensor or camera on the vehicle.

In other embodiments where vehicle 1100 is an at least partially autonomous robot, vehicle 1100 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 1106 may be determined such that a propulsion unit, steering unit and/or brake unit of the mobile robot may be controlled such that the mobile robot may avoid collisions with identified objects.

In another embodiment, vehicle 1100 is an at least partially autonomous robot in the form of a gardening robot. In such embodiment, vehicle 1100 may use an optical sensor as sensor 1104 to determine a state of plants in an environment proximate vehicle 1100. Actuator 1106 may be a nozzle configured to spray chemicals. Depending on an identified species and/or an identified state of the plants, actuator control command 1102 may be determined to cause actuator 1106 to spray the plants with a suitable quantity of suitable chemicals.

Vehicle 1100 may be an at least partially autonomous robot in the form of a domestic appliance. Non-limiting examples of domestic appliances include a washing machine, a stove, an oven, a microwave, or a dishwasher. In such a vehicle 1100, sensor 1104 may be an optical or acoustic sensor configured to detect a state of an object which is to undergo processing by the household appliance. For example, in the case of the domestic appliance being a washing machine, sensor 1104 may detect a state of the laundry inside the washing machine. Actuator control command may be determined based on the detected state of the laundry.

In this embodiment, the control system 1102 would receive image (optical or acosutic) and annotation information from sensor 1104. Using these and a prescribed number of classes k and similarity measure K that are stored in the system, the control system 1102 may use the method described in FIG. 10 to classify each pixel of the image received from sensor 1104. Based on this classification, signals may be sent to actuator 1106, for example, to brake or turn to avoid collisions with pedestrians or trees, to steer to remain between detected lane markings, or any of the actions performed by the actuator 1106 as described above. Signals may also be sent to sensor 1104 based on this classification, for example, to focus or move a camera lens.

Figure 12:
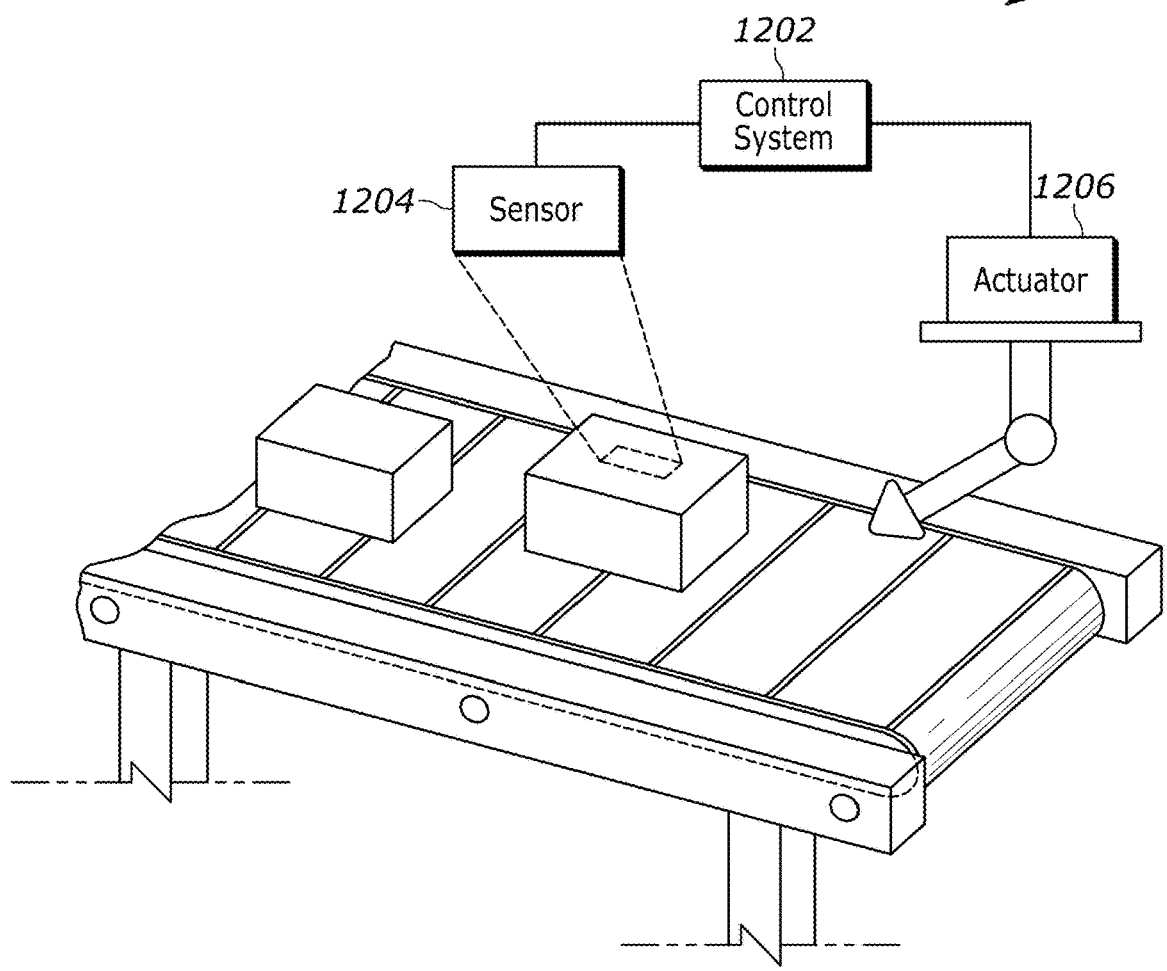
FIG. 12 is a schematic diagram of a control system configured to control a manufacturing machine.

FIG. 12 depicts a schematic diagram of control system 1202 configured to control system 1200 (e.g., manufacturing machine), such as a punch cutter, a cutter or a gun drill, of manufacturing system 102, such as part of a production line. Control system 1202 may be configured to control actuator 14, which is configured to control system 100 (e.g., manufacturing machine).

Sensor 1204 of system 1200 (e.g., manufacturing machine) may be an wave energy sensor such as an optical or acoustic sensor or sensor array configured to capture one or more properties of a manufactured product. Control system 1202 may be configured to determine a state of a manufactured product from one or more of the captured properties. Actuator 1206 may be configured to control system 1202 (e.g., manufacturing machine) depending on the determined state of manufactured product 104 for a subsequent manufacturing step of the manufactured product. The actuator 1206 may be configured to control functions of FIG. 11 (e.g., manufacturing machine) on subsequent manufactured products of the system (e.g., manufacturing machine) depending on the determined state of the previous manufactured product.

In this embodiment, the control system 1202 would receive image (e.g., optical or acoustic) and annotation information from sensor 1204. Using these and a prescribed number of classes k and similarity measure K that are stored in the system, the control system 1202 may use the method described in FIG. 10 to classify each pixel of the image received from sensor 1204, for example, to segment an image of a manufactured object into two or more classes, to detect anomalies in the manufactured product, to ensure the presence of objects on the manufactured product such as barcodes. Based on this classification, signals may be sent to actuator 1206. For example, if control system 1202 detects anomalies in a product, actuator 1206 may mark or remove anomalous or defective products from the line. In another example, if control system 1202 detects the presence of barcodes or other objects to be placed on the product, actuator 1106 may apply these objects or remove them. Signals may also be sent to sensor 1204 based on this classification, for example, to focus or move a camera lens.

Figure 13:
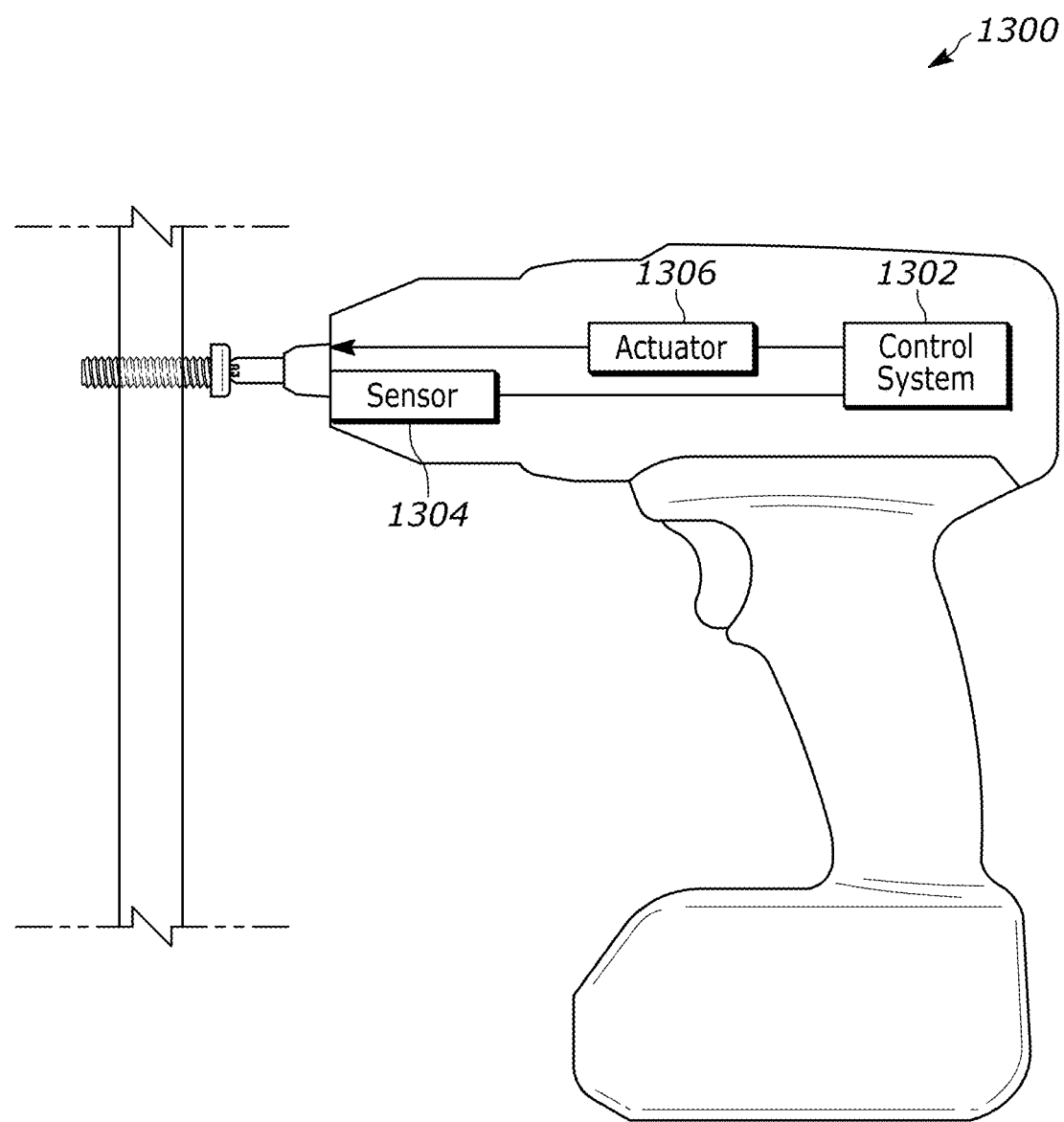
FIG. 13 is a schematic diagram of a control system configured to control a power tool.

FIG. 13 depicts a schematic diagram of control system 1302 configured to control power tool 1300, such as a power drill or driver, that has an at least partially autonomous mode. Control system 1302 may be configured to control actuator 1306, which is configured to control power tool 1300.

Sensor 1304 of power tool 1300 may be a wave energy sensor such as an optical or acoustic sensor configured to capture one or more properties of a work surface and/or fastener being driven into the work surface. Control system 1302 may be configured to determine a state of work surface and/or fastener relative to the work surface from one or more of the captured properties.

In this embodiment, the control system 1302 would receive image (e.g., optical or acoustic) and annotation information from sensor 1304. Using these and a prescribed number of classes k and similarity measure K that are stored in the system, the control system 1302 may use the method described in FIG. 10 to classify each pixel of the image received from sensor 1304 in order to segment an image of a work surface or fastener into two or more classes or to detect anomalies in the work surface or fastener. Based on this classification, signals may be sent to actuator 1306, for example to the pressure or speed of the tool, or any of the actions performed by the actuator 1306 as described in the above sections. Signals may also be sent to sensor 1304 based on this classification, for example, to focus or move a camera lens. In another example, the image may be a time series image of signals from the power tool 1300 such as pressure, torque, revolutions per minute, temperature, current, etc. in which the power tool is a hammer drill, drill, hammer (rotary or demolition), impact driver, reciprocating saw, oscillating multi-tool, and the power tool is either cordless or corded.

Figure 14:
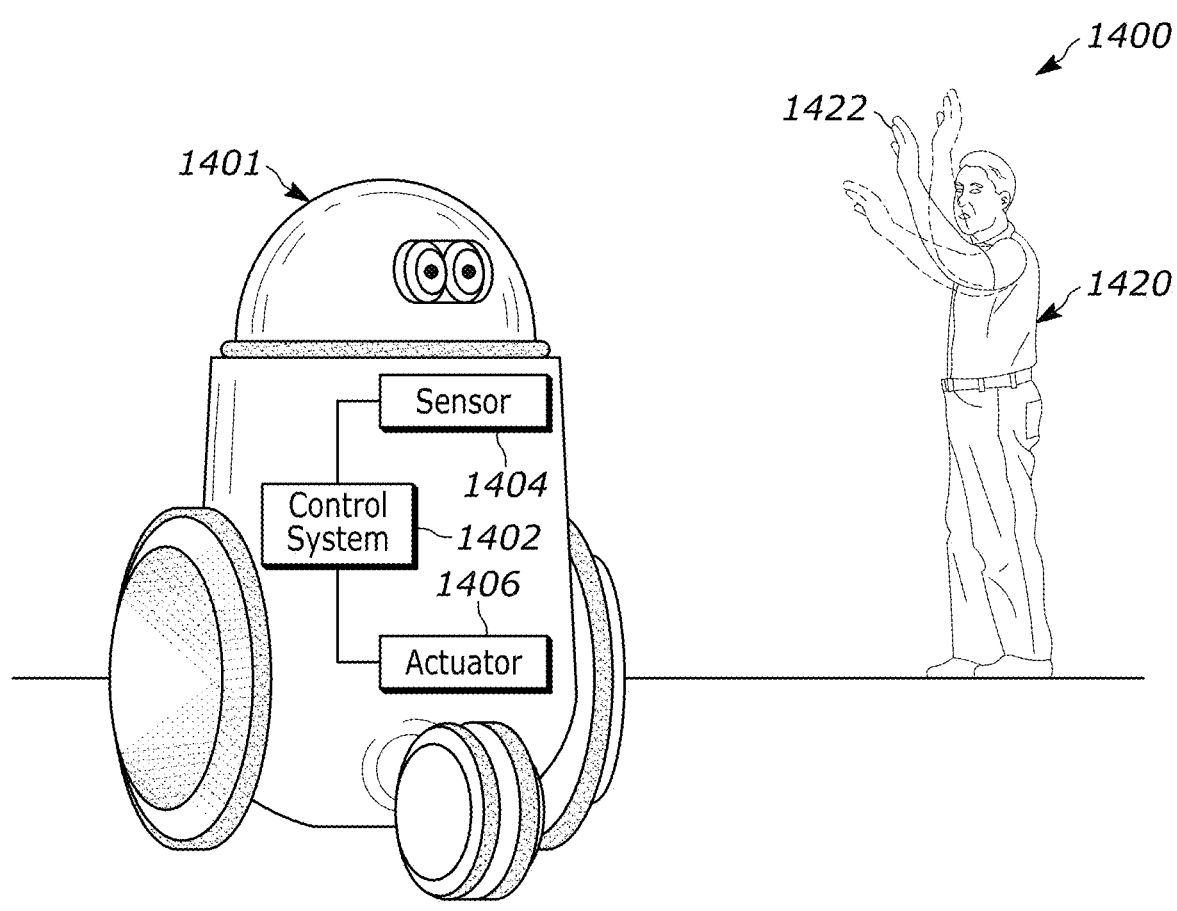
FIG. 14 is a schematic diagram of a control system configured to control an automated personal assistant.

FIG. 14 depicts a schematic diagram of control system 1402 configured to control automated personal assistant 1401. Control system 1402 may be configured to control actuator 1406, which is configured to control automated personal assistant 1401. Automated personal assistant 1401 may be configured to control a domestic appliance, such as a washing machine, a stove, an oven, a microwave or a dishwasher.

In this embodiment, the control system 1402 would receive image (e.g., optical or acoustic) and annotation information from sensor 1404. Using these and a prescribed number of classes k and similarity measure K that are stored in the system, the control system 1402 may use the method described in FIG. 10 to classify each pixel of the image received from sensor 1404, for example, to segment an image of an appliance or other object to manipulate or operate. Based on this classification, signals may be sent to actuator 1406, for example, to control moving parts of automated personal assistant 1401 to interact with domestic appliances, or any of the actions performed by the actuator 1406 as described in the above sections. Signals may also be sent to sensor 1404 based on this classification, for example, to focus or move a camera lens.

Figure 15:
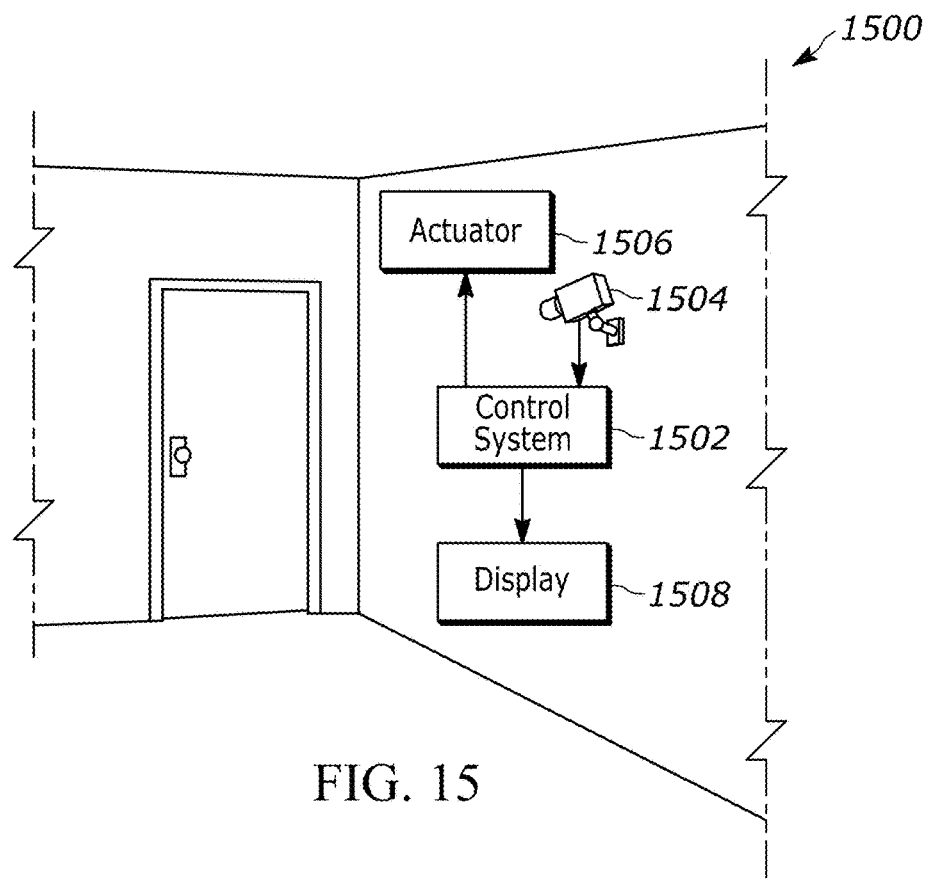
FIG. 15 is a schematic diagram of a control system configured to control a monitoring system.

FIG. 15 depicts a schematic diagram of control system 1502 configured to control monitoring system 1500. Monitoring system 1500 may be configured to physically control access through door 252. Sensor 1504 may be configured to detect a scene that is relevant in deciding whether access is granted. Sensor 1504 may be an optical or acoustic sensor or sensor array configured to generate and transmit image and/or video data. Such data may be used by control system 1502 to detect a person's face.

Monitoring system 1500 may also be a surveillance system. In such an embodiment, sensor 1504 may be a wave energy sensor such as an optical sensor, infrared sensor, acoustic sensor configured to detect a scene that is under surveillance and control system 1502 is configured to control display 1508. Control system 1502 is configured to determine a classification of a scene, e.g. whether the scene detected by sensor 1504 is suspicious. A perturbation object may be utilized for detecting certain types of objects to allow the system to identify such objects in non-optimal conditions (e.g., night, fog, rainy, interfering background noise etc.). Control system 1502 is configured to transmit an actuator control command to display 1508 in response to the classification. Display 1508 may be configured to adjust the displayed content in response to the actuator control command. For instance, display 1508 may highlight an object that is deemed suspicious by controller 1502.

In this embodiment, the control system 1502 would receive image (optical or acoustic) and annotation information from sensor 1504. Using these and a prescribed number of classes k and similarity measure K that are stored in the system, the control system 1502 may use the method described in FIG. 10 to classify each pixel of the image received from sensor 1504 in order to, for example, detect the presence of suspicious or undesirable objects in the scene, to detect types of lighting or viewing conditions, or to detect movement. Based on this classification, signals may be sent to actuator 1506, for example, to lock or unlock doors or other entryways, to activate an alarm or other signal, or any of the actions performed by the actuator 1506 as described in the above sections. Signals may also be sent to sensor 1504 based on this classification, for example, to focus or move a camera lens.

Figure 16:
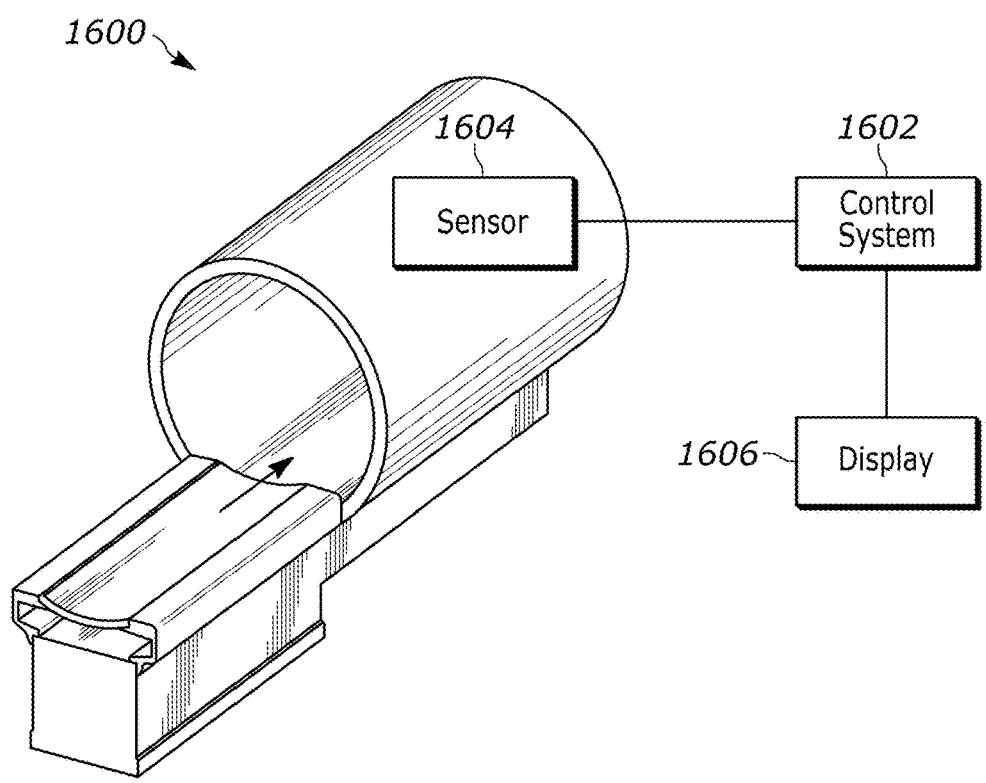
FIG. 16 is a schematic diagram of a control system configured to control a medical imaging system.

FIG. 16 depicts a schematic diagram of control system 1602 configured to control imaging system 1600, for example an MRI apparatus, x-ray imaging apparatus or ultrasonic apparatus. Sensor 1604 may, for example, be an imaging sensor or acoustic sensor array. Control system 1602 may be configured to determine a classification of all or part of the sensed image. Control system 1602 may be configured to determine or select an actuator control command in response to the classification obtained by the trained neural network. For example, control system 1602 may interpret a region of a sensed image (optical or acoustic) to be potentially anomalous. In this case, the actuator control command may be determined or selected to cause display 1606 to display the imaging and highlighting the potentially anomalous region.

In this embodiment, the control system 1602 would receive image and annotation information from sensor 1604. Using these and a prescribed number of classes k and similarity measure $\overline{K}$ that are stored in the system, the control system 1602 may use the method described in FIG. 10 to classify each pixel of the image received from sensor 1604. Based on this classification, signals may be sent to actuator 1606, for example, to detect anomalous regions of the image or any of the actions performed by the actuator 1606 as described in the above sections.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

While all of the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

What is claimed is:

1. An anomalous region detection method comprising:
    receiving, from one or more sensors, time series data being grouped in patches;
    encoding, via parameters of an encoder associated with a neural network, the time series data to obtain local latent representations for each patch;
    determining, utilizing the neural network, for each patch, a representation loss from the local latent representations;
    transforming the local latent representations associated with each patch, via at least two local neural transformations associated with the neural network, to a series of diverse transformed vector representations that are each different from one another and offering different views of each patch;
    determining a dynamic deterministic contrastive loss (DDCL) in response to the series of diverse transformed vector representations;

combining the representation loss and the DDCL to obtain updated parameters of the neural network;

updating the parameters of the encoder associated with the neural network with the updated parameters;

scoring each of the series of the diverse transformed vector representations, via the DDCL, to obtain a diverse semantic requirement score associated with each patch;

smoothing the diverse semantic requirement score to obtain a loss region;

masking data associated with the loss region to obtain verified data; and outputting the verified data.

2. The anomalous region detection method of claim 1, wherein the neural network is a Recurrent Neural Network (RNN) or Convolutional Neural Network (CNN).

3. The anomalous region detection method of claim 1, wherein smoothing the diverse semantic requirement score is performed via Viterbi decoding.

4. The anomalous region detection method of claim 1, wherein smoothing the diverse semantic requirement score includes generating a histogram of the diverse semantic requirement score and filtering data with a score above a threshold to obtain the loss region.

5. The anomalous region detection method of claim 1, wherein calculating a representation loss is calculating a Contrastive Predictive Coding (CPC) loss.

6. The anomalous region detection method of claim 5, wherein calculating the CPC loss from the vector representation is calculated according to $$\mathcal{L}_{CPC} = -\mathbb{E}_z\left[\log\frac{f_k(z_{t+k}, c_t)}{\sum_{z_j \in Z} f_k(z_j, c_t)}\right]$$

where $\mathbb{E}$ is the Expectation function, $z_t$ is the local latent representations of the encoded data, t is a time index, $W_k$ is a matrix of parameters where k is width of the time index, $f_k(a,b)=f(a,W_k b)$ is comparison function between its two arguments parameterized by $W_k$, $\mathcal{L}_{CPC}$ is the Contrastive Predictive Coding (CPC) loss, $c_t$ is a context representation.

7. The anomalous region detection method of claim 1, wherein calculating a DDCL loss from the diverse transformed vector representations is calculated according to $$L_{DDCL} = -\mathbb{E}_z\left[\sum_{k=1}^{K}\sum_{t}^{T}\sum_{i \in L} \ell_t^{(k,l)}\right]$$

where $\mathbb{E}$ is the Expectation function, t is a time index, k is width of the time index, l is the index of the local neural transformation, $l_t^{(k,l)}$ is the score and $L_{DDCL}$ is the dynamic deterministic contrastive loss.

8. The anomalous region detection method of claim 1, wherein scoring each of the series of the diverse transformed vector representations is calculated according to $$\ell_t^{(k,l)} = \log\frac{h(z_{t+k}^{(l)}, W_k c_t)}{h(z_{t+k}^{(l)}, W_k c_t) + \sum_{m \neq l} h(z_{t+k}^{(l)}, z_{i+k}^{(m)})}$$

where $l_t^{(k,l)}$ is the score, $z_t$ is the local latent representations of the encoded data, t is a time index, $W_k$ is a matrix of parameters where k is width of the time index, $$h(z_i, z_j) := \exp\frac{z_i^T z_j}{\|z_i\|\|z_j\|} \text{ is}$$

the cosine similarity function, and $c_t$ is a context representation.

9. The anomalous region detection method of claim 1 further comprising operating a machine based on the verified data, wherein the time series data is received from a sensor.

10. An anomalous region detection system comprising:
a controller in communication with a non-transitory storage medium, the controller configured to:
receive time series data, from a first sensor, the data being grouped in patches;
encode, via parameters of an encoder of a neural network, the data to obtain local latent representations for each patch;
calculate, for each patch, a Contrastive Predictive Coding (CPC) loss from the local latent representations;
transform the local latent representations associated with each patch, via at least two local neural transformations, to a series of diverse transformed vector representations that are different from one another;
calculate a dynamic deterministic contrastive loss (DDCL) from the series of diverse transformed vector representations;
combine the CPC loss and the DDCL to obtain updated parameters;
update the parameters of the encoder of the associated neural network with the updated parameters;
score each of the series of the diverse transformed vector representations, via the DDCL, to obtain a diverse semantic requirement score associated with each patch;
smooth the diverse semantic requirement score to obtain a loss region;
mask data associated with the loss region to obtain verified data; and
operate a machine based on the verified data.

11. The anomalous region detection system of claim 10, wherein the controller is configured to smooth the diverse semantic requirement score is via Viterbi decoding.

12. The anomalous region detection system of claim 10, wherein the controller is configured to smooth the diverse semantic requirement score by generating a histogram of the diverse semantic requirement score and filtering data with a score above a threshold to obtain the loss region.

13. The anomalous region detection system of claim 10, wherein the controller is configured to calculating the CPC loss from the vector representation is according to $$\mathcal{L}_{CPC} = -\mathbb{E}_z\left[\log\frac{f_k(z_{t+k}, c_t)}{\sum_{z_j \in Z} f_k(z_j, c_t)}\right]$$

where $\mathbb{E}$ is the Expectation function, $z_t$ is the local latent representations of the encoded data, t is a time index, $W_k$ is a matrix of parameters where k is width of the time index, $f_k(a,b)=f(a,W_k b)$ is comparison function between its two arguments parameterized by $W_k$, $L_{CPC}$ is the Contrastive Predictive Coding (CPC) loss, $c_t$ is a context representation.

14. The anomalous region detection system of claim 10, wherein the first sensor is an optical sensor, an automotive sensor, or an acoustic sensor and the machine is an autonomous vehicle.

15. The anomalous region detection system of claim 10, wherein the first sensor is an RF sensor and the machine is a telecommunication machine.

16. A telecommunication system comprising:
a controller in communication with a non-transitory storage medium, the controller configured to,
receive, from one or more sensors, time series data being grouped in patches, wherein the time series data;
encode, via parameters of an encoder of a neural network, the data to obtain local latent representations for each patch;
determining, for each patch, a Contrastive Predictive Coding (CPC) loss from the local latent representations;
transform the local latent representations associated with each patch, via at least two local neural transformations associated with the neural network, to a series of diverse transformed vector representations that are each different from one another and offering different views of each patch;
calculate a dynamic deterministic contrastive loss (DDCL) in response to the series of diverse transformed vector representations;
combine the CPC loss and the DDCL to obtain updated parameters;
update the parameters of the encoder associated with the neural network with the updated parameters;
score each of the series of the diverse transformed vector representations, via the DDCL, to obtain a diverse semantic requirement score associated with each patch;
smooth the diverse semantic requirement score to obtain a loss region;
mask data associated with the loss region to obtain verified data; and
operate the telecommunication system based on the verified data.

17. The telecommunication system of claim 16, wherein the controller is configured to smooth the diverse semantic requirement score is via Viterbi decoding.

18. The telecommunication system of claim 16, wherein the controller is configured to smooth the diverse semantic requirement score by generating a histogram of the diverse semantic requirement score and filtering data with a score above a threshold to obtain the loss region.

19. The telecommunication system of claim 16, wherein the controller is configured to calculating the CPC loss from the vector representation is according to $$\mathcal{L}_{CPC} = -\mathbb{E}_z \left[ \log \frac{f_k(z_{t+k}, c_t)}{\sum_{z_j \in Z} f_k(z_j, c_t)} \right]$$

where $\mathbb{E}$ is the Expectation function, $z_t$ is the local latent representations of the encoded data, t is a time index, $W_k$ is a matrix of parameters where k is width of the time index, $f_k(a,b)=f(a,W_k b)$ is comparison function between its two arguments parameterized by $W_k$, $L_{CPC}$ is the Contrastive Predictive Coding (CPC) loss, $c_t$ is a context representation.

20. The telecommunication system of claim 16, wherein the controller is configured to score each of the series of the diverse transformed vector representations is according to $$l_t^{(k,l)} = \log \frac{h(z_{t+k}^{(l)}, W_k c_t)}{h(z_{t+k}^{(l)}, W_k c_t) + \sum_{m \neq t} h(z_{t+k}^{(l)}, z_{t+k}^{(m)})}$$

where $l_t^{(k,l)}$ is the score, $z_t$ is the local latent representations of the encoded data, t is a time index, $W_k$ is a matrix of parameters where k is width of the time index, $$h(z_i, z_j) := \exp \frac{z_i^T z_j}{\|z_i\|\|z_j\|} \text{ is}$$

the cosine similarity function, and $c_t$ is a context representation.

* * * * *